(12) United States Patent
Amano

(10) Patent No.: US 6,414,258 B1
(45) Date of Patent: *Jul. 2, 2002

(54) BASE CARRIER FOR TRACKLAYING VEHICLE AND HARD FACING METHOD

(75) Inventor: Masaharu Amano, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/532,891

(22) Filed: Mar. 22, 2000

(30) Foreign Application Priority Data

| Mar. 23, 1999 | (JP) | 11-077464 |
| Mar. 23, 1999 | (JP) | 11-077986 |
| Mar. 30, 1999 | (JP) | 11-087729 |
| Oct. 1, 1999 | (JP) | 11-281981 |

(51) Int. Cl.$^7$ .......................... B23K 9/04; B23K 25/00; E21B 10/00
(52) U.S. Cl. ............................ 219/76.14; 219/76.15; 175/374
(58) Field of Search ............................ 219/76.14, 76.15, 219/76.1, 77; 175/374, 425; 305/38

(56) References Cited

U.S. PATENT DOCUMENTS

| 3,955,855 | A | * | 5/1976 | Massieon et al. | 305/38 |
| 4,042,282 | A | * | 8/1977 | Haslett et al. | 305/11 |
| 4,097,711 | A | * | 6/1978 | Banerjee | 219/76.15 |
| 4,243,727 | A | | 1/1981 | Wisler et al. | |
| 4,682,987 | A | * | 7/1987 | Brady et al. | 51/293 |
| 5,778,994 | A | * | 7/1998 | Spatz | 175/374 |
| 5,829,850 | A | * | 11/1998 | Ketting et al. | 305/194 |
| 5,852,272 | A | * | 12/1998 | Amano | 219/76.14 |
| 5,967,248 | A | * | 10/1999 | Drake et al. | 175/245 |
| 5,988,302 | A | | 11/1999 | Sreshta et al. | |
| 6,029,759 | A | * | 2/2000 | Sue et al. | 175/374 |
| 6,270,595 | B1 | * | 8/2001 | Takayama et al. | 148/570 |

FOREIGN PATENT DOCUMENTS

JP 59-78794 5/1984

OTHER PUBLICATIONS

The Lincoln Electric Company—Hardfacing Product Selection Guide. (12/92).
American Society for Metals—Metals Handbook, 8th Edition, vol. 6. (no date available).
The Lincoln Electric Company—Electrodes and Fluxes for Build–up and Hardfacing. (10/87).

* cited by examiner

*Primary Examiner*—Tom Dunn
*Assistant Examiner*—L. Edmondson
(74) *Attorney, Agent, or Firm*—Armstrong, Westerman, & Hattori, LLP

(57) ABSTRACT

The objects of the invention are: a weld overlay having stable quality is provided; cracks which have been created on a weld overlay during engagement of a part with its mating member are prevented from extending; and adverse effects on the wear of mating member are avoided. A weld overlay containing hard particles is formed on each tooth of a sprocket 6 such that each bead extending a direction (direction B) perpendicular to the rotating direction of the sprocket 6. A weld overlay containing hard particles is formed on the outer peripheral surface of a bushing such that each bead extends in a direction perpendicular to the rotating direction of the sprocket, the outer peripheral surface serving as a contact surface for the sprocket which engages with the bushing.

29 Claims, 40 Drawing Sheets

CRACKING THAT OCCURRED IN WELD OVERLAY FORMATION

THE CROSS SECTION OF A CUT IN A SPECIMEN

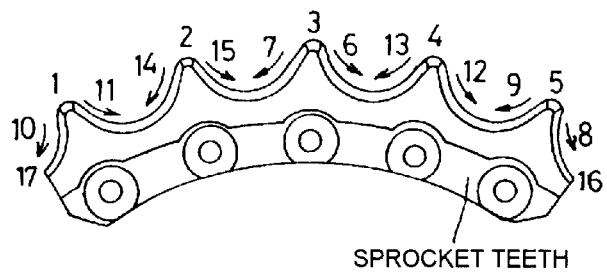
FIG. 6 (a)
OVERLAYING ORDER
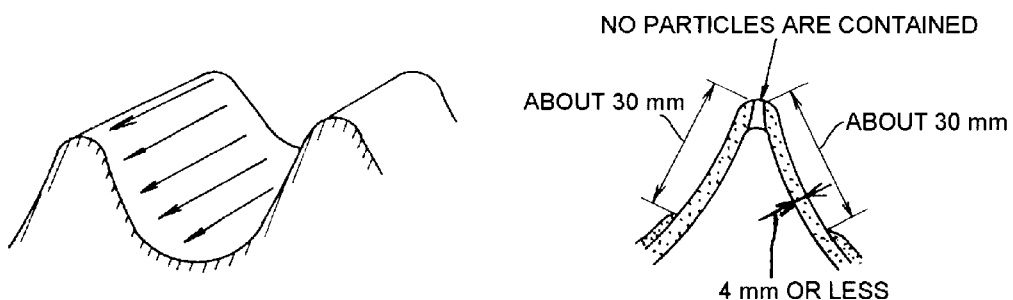
FIG. 6 (b)
OVERLAYING DIRECTION
FIG. 6 (c)
THE OVERLAYING CONDITION OF THE AREA NEAR A TOOTH TIP

THE HARDNESS DISTRIBUTION OF A SPROCKET TOOTH (EXAMPLE 1)

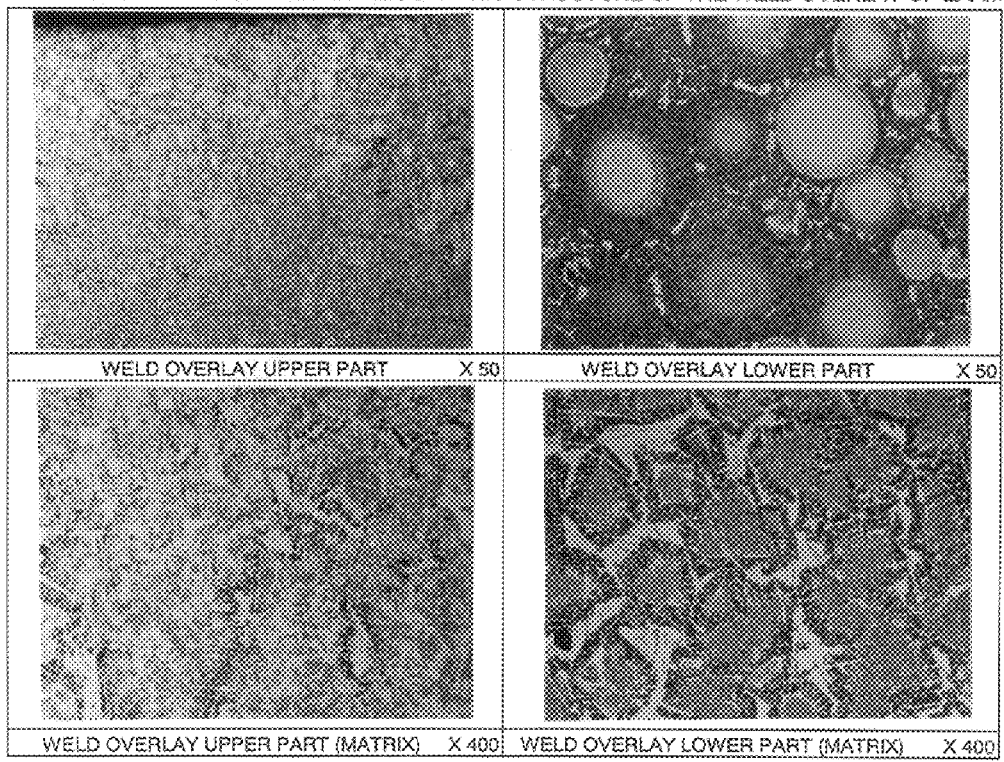

MICROPHOTOGRAPHS OF THE METALLOGRAPHIC STRUCTURE OF
THE WELD OVERLAY OF EXAMPLE 1

THE CURVING AMOUNT OF SPROCKET TEETH

A EXPLANATORY DIAGRAM OF A CURVING AMOUNT MEASUREMENT METHOD

THE OVERLAYING ORDER OF COMPARATIVE EXAMPLE 1

FIG. 15 THE RESULT OF HARDNESS MEASUREMENT ON SPROCKET TEETH OVERLAY (COMPARATIVE EXAMPLE 1)

MICROPHOTOGRAPHS OF THE METALLOGRAPHIC STRUCTURE OF THE WELD OVERLAY OF COMPARATIVE EXAMPLE 1

MICROPHOTOGRAPHS OF THE METALLOGRAPHIC STRUCTURE OF THE WELD OVERLAY OF COMPARATIVE EXAMPLE 1

CORROSIVE SOLUTION: 10% NITAL

FIG. 18 THE CROSS SECTION HARDNESS DISTRIBUTION OF THE BASE MATERIAL OF EXAMPLE 3

THE END FACE HARDNESS OF THE BASE MATERIAL, RESIDUAL STRESSES ON THE OUTER PERIPHERAL SURFACE OF THE BASE MATERIAL, AND THE POSITIONS OF A CRACK ON THE WELD OVERLAY IN EXAMPLE 3

(RESIDUAL STRESS: kg/mm²)

THE HARDNESS DISTRIBUTION OF THE CARBURIZED LAYER OF EXAMPLE 3 (THE AREA FROM THE INNER PERIPHERAL SURFACE TO THE OUTER PERIPHERAL SURFACE)

MICROPHOTOGRAPHS OF THE METALLOGRAPHIC STRUCTURE OF
THE WELD OVERLAY OF EXAMPLE 3

CORROSIVE SOLUTION: 10% NITAL

MICROPHOTOGRAPHS OF THE METALLOGRAPHIC STRUCTURE OF THE WELD OVERLAY OF EXAMPLE 3

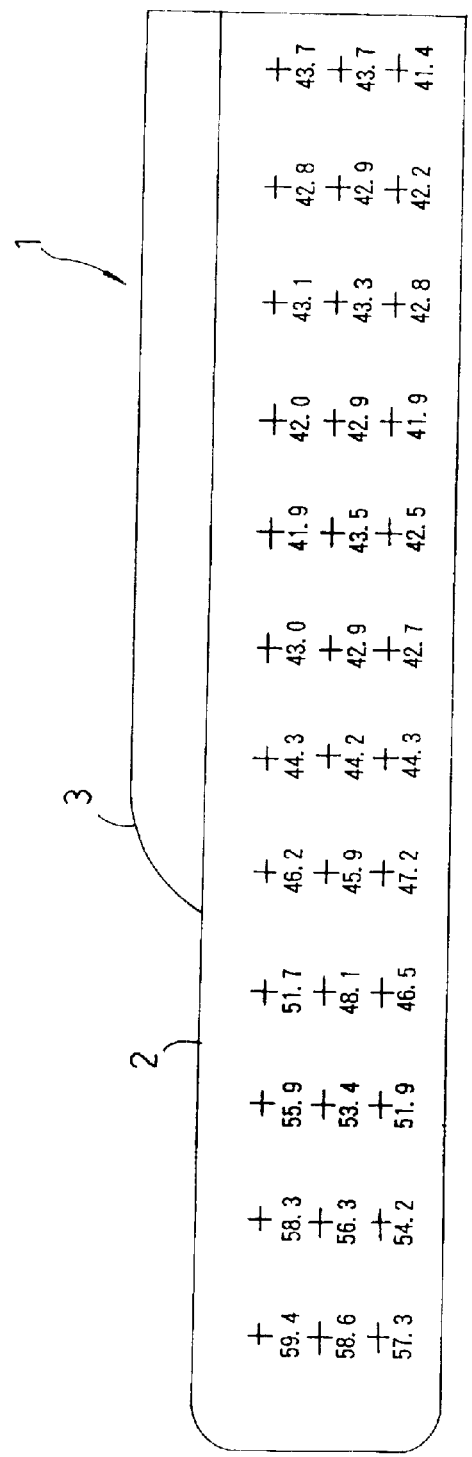
FIG. 24 THE CROSS SECTION HARDNESS DISTRIBUTION OF THE BASE MATERIAL OF EXAMPLE 4

A VIEW OF CRACKING CONDITIONS AFTER OIL HARDENING / TEMPERING AND RESIDUAL STRESSES ON THE OUTER PERIPHERAL SURFACE OF THE BASE MATERIAL OF EXAMPLE 4

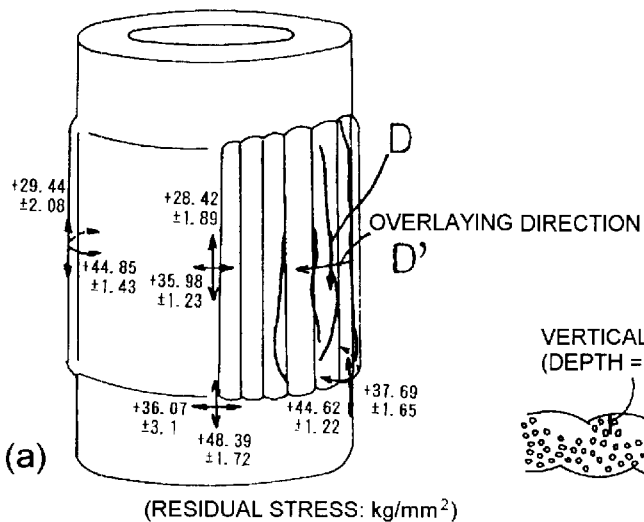

FIG. 25 (a)

(RESIDUAL STRESS: kg/mm²)

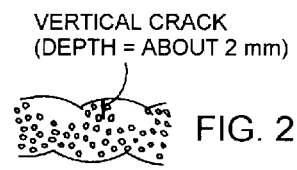

FIG. 25 (c)

VERTICAL CRACK (DEPTH = ABOUT 2 mm)

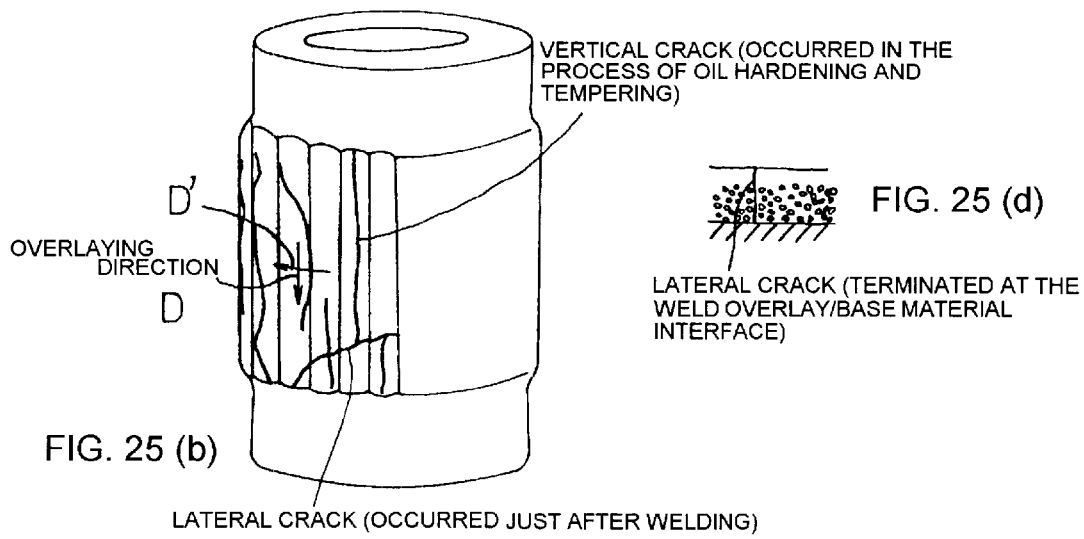

FIG. 25 (b)

LATERAL CRACK (OCCURRED JUST AFTER WELDING)

FIG. 25 (d)

LATERAL CRACK (TERMINATED AT THE WELD OVERLAY/BASE MATERIAL INTERFACE)

VERTICAL CRACK (OCCURRED IN THE PROCESS OF OIL HARDENING AND TEMPERING)

A VIEW OF A CRACKING CONDITION BEFORE OIL HARDENING AND TEMPERING IN COMPARATIVE EXAMPLE 2

A VIEW OF A CRACKING CONDITION AND RESIDUAL STRESSES AFTER OIL HARDENING AND TEMPERING IN COMPARATIVE EXAMPLE 2

A VIEW OF A CRACKING CONDITION AND RESIDUAL STRESSES AFTER OIL HARDENING AND TEMPERING IN COMPARATIVE EXAMPLE 3

(RESIDUAL STRESS: kg/mm²)

A VIEW OF A CRACKING CONDITION AND RESIDUAL STRESSES AFTER OIL HARDENING AND TEMPERING ACCORDING TO COMPARATIVE EXAMPLE 4

AN ENLARGED VIEW OF AREA P

A VIEW OF CRACKING CONDITIONS AFTER OIL HARDENING AND
TEMPERING IN COMPARATIVE EXAMPLE 5

A VIEW OF A CRACKING CONDITION, END FACE HARDNESS, AND RESIDUAL STRESSES AFTER INNER PERIPHERAL SURFACE INDUCTION HARDENING AND TEMPERING IN COMPARATIVE EXAMPLE 6

(RESIDUAL STRESS: kg/mm$^2$)

A VIEW OF A CRACKING CONDITION, END FACE HARDNESS, AND RESIDUAL STRESSES AFTER INNER PERIPHERAL SURFACE INDUCTION HARDENING AND TEMPERING IN COMPARATIVE EXAMPLE 8

(RESIDUAL STRESS: kg/mm$^2$)

A VIEW OF A CRACKING CONDITION AND END FACE HARDNESS AFTER OVERLAYING IN COMPARATIVE EXAMPLE 7

THE CROSS SECTION OF A CUT IN A SPECIMEN

A GRAPH OF TEST RESULT though with considerably great contact pressure and used in such a situation that they are repeatedly brought into sliding contact with each other with sand and rocks entrapped therebetween. In the case of a bulldozer for use in mining oil sand for example, soil and sand are more likely to stick to its base carriers because of the high viscosity of oil sand. This aggravates the entrapment of sand and soil so that the base carriers for such a bulldozer wear at much faster rates than those of ordinary bulldozers. Therefore, there are strong demands for the development of base carrier parts improved in wear resistance.

BASE CARRIER FOR TRACKLAYING VEHICLE AND HARD FACING METHOD

TECHNICAL FIELD OF THE INVENTION

The present invention relates to a base carrier for a tracklaying vehicle, which has a crawler belt provided with bushings each mounted between a pair of opposed links; and a sprocket comprising a plurality of teeth engaging with the bushings respectively. The invention also relates to hard facing methods for sprocket teeth and bushings which constitute a base carrier.

BACKGROUND OF THE INVENTION

Tracklaying vehicles such as bulldozers are usually operated on an unleveled ground and therefore their base carriers are subjected to extremely severe wear conditions through working because of the presence of sand and rocks. The wear rates of the crawler bushings and sprocket teeth are comparatively fast since they are subjected to considerably great contact pressure and used in such a situation that they are repeatedly brought into sliding contact with each other with sand and rocks entrapped therebetween. In the case of a bulldozer for use in mining oil sand for example, soil and sand are more likely to stick to its base carriers because of the high viscosity of oil sand. This aggravates the entrapment of sand and soil so that the base carriers for such a bulldozer wear at much faster rates than those of ordinary bulldozers. Therefore, there are strong demands for the development of base carrier parts improved in wear resistance.

In an attempt to impart wear resistance to parts which are locally required wear-resistance, a wear-resistant weld overlay having a composite structure composed of a matrix metal (untreated soft material) and hard particles or the like is applied to the surface of a base material. As one example of such a technique, a surface hardening method for tool joints is disclosed in Japanese Patent Publication (KOKOKU) Gazette No. 56-35986 (1981) according to which hard particles are dropped from a point proximate to the arc into a molten weld pool so as to precipitate on the bottom of the matrix and so as not to protrude from the surface of the a=matrix. In this surface hardening method, the effects of the sedimentation of the particles are: (1) since the particles do not protrude from the bead surfaces, a casing, that is, the mating member the joint, does not get damaged; and (2) the hardness of the metal (parent phase metal) which holds the precipitated cemented carbide particles increases, leading to improved wear resistance in the region where the cemented carbide particles have deposited. Another example is disclosed in U.S. Pat. No. 4,097,711. This patent proposes a surface treatment method for steel rollers comprising the steps of carburizing the surface of a material up to a depth equal to at least a half of the required depth of surface treatment; supplying particles for surface treatment to a molten weld pool and evenly dispersing them to obtain an effective hardness through the thickness of the whole molten part; applying thermal treatments to this molten part in order to obtain the required properties in the surface structure as well as in the base material. In this surface treatment method, it is admitted that the effect of the uniform dispersion of the particles is (1) an improvement in wear resistance and the effects of the carburization are (1) an improvement in the fatigue strength of the steel roller body and (2) an improvement in the wear resistance of the steel roller body.

However, these surface hardening methods reveal the following drawbacks when they are applied, as they are, to the base carrier parts of a tracklaying vehicle such as sprockets and bushing.

(1) During traveling, the sprocket and bushings of the base carrier intermittently come into contact with each other so that loads are repeatedly imposed on these parts. In the above conventional methods, cracks running transversely to the overlay beads are often created during formation of the weld overlay and stresses are repeatedly concentrated on the cracks, aggravating them. This causes exfoliation or partial chipping of the weld overlay and development of the cracks into the parts, resulting in breakage of the parts in themselves. Such cracks are created in the weld overlay not only during formation of the weld overlay, but also during travel of the tracklaying vehicle due to repetitive loads in cases where the weld overlay is inhomogeneous or the shape of the overlay surface is uneven. In the latter case, there would also occur exfoliation and chipping of the weld overlay, and, still more, breakage of the parts per se. However, the above conventional methods do not teach any techniques for preventing cracking which occurs during formation of the weld overlay; cracking which occurs during travel due to the inhomogeneous structure of the weld overlay or unevenness in the surface of the weld overlay; and exfoliation, chipping and extension of cracks.

(2) Cracking due to repetitive loads during travel occurs not only in the weld overlay but also on the surface of the bushing body. Such cracking develops similarly to the above-mentioned cracking, sometimes leading to breakage of the bushing. U.S. Pat. No. 4,097,711 teaches a carburizing process capable of improving fatigue strength, according to which a weld overlay is formed after carburization and then quenching/tempering is carried out. In other words, a weld overlay is applied to high-carbonized steel. This process, however, presents the problem that the area near the boundary (the toe of the weld overlay) between the weld overlay and the body of the par is hardened and liable to cracking during weld overlay formation.

(3) Since the hard particles dispersed in the weld overlay have much higher wear resistance than the matrix (parent phase metal) which holds the hard particles, wear progresses with the hard particles coming to project from the weld overlay and the worn surface with the protrudent hard particles scrapes off a mating member to be engaged with the part, with the result that wear is still more expedited. The above conventional method does not discuss the problem attributable to wear patterns and its solution as well as the relationship between wear patterns and the preferable structure of the weld overlay.

The present invention is directed to overcoming the foregoing problems and a first object of the invention is therefore to provide a base carrier for a tracklaying vehicle, the base carrier being designed such that prompt conformability with a mating member is ensured by utilizing wear which occurs at the initial stage of traveling; exfoliation nor chipping is not caused in the weld overlay in engagement of the part with its mating member; cracking which has occurred during overlaying is prevented from extending, leading to breakage of the part; no new cracking occurs nor develops when the part is in operation; and the mating member is not adversely affected by the part during travel.

A second object of the invention is to provide a hard facing method for sprocket teeth which method meets the first object and has the capability of further improving wear resistance by providing a weld overlay with a property of prompt conformability relative to a mating member by utilizing wear at the initial stage of traveling; preventing occurrence of cracking as much as possible during overlaying in order to prevent exfoliation and chipping of the weld overlay during operation; stabilizing the quality of the weld overlay, that is, the amount and distribution of hard particles and the structure and hardness of a parent phase metal; and rendering the wear surface smooth during service so that damage to the mating member and falling and chipping of the part, which are attributable to scraping of the mating member due to the projection of the hard particles, are all prevented.

A third object of the invention is to provide a hard facing method for bushings, which method meets the first object and has the capability of further improving wear resistance by providing a weld overlay with a property of prompt conformability relative to a mating member by utilizing wear at the initial stage of traveling; preventing occurrence of cracking as much as possible during overlaying in order to prevent exfoliation and chipping of the weld overlay during operation; stabilizing the quality of the weld overlay, that is, the amount and distribution of hard particles and the structure and hardness of a parent phase metal; increasing the hardness of the metal (parent phase metal) which holds the hard particles of the weld overlay, by thermal treatments without causing quenching cracks; increasing the wear resistance and fatigue strength of the bushing body; and rendering the wear surface smooth during service so that damage to the mating member and falling and chipping of the part, which are attributable to scraping of the mating member by the projection of the hard particles, are all prevented.

DISCLOSURE OF THE INVENTION

The first object can be accomplished by a base carrier for a tracklaying vehicle according to a first aspect of the invention (associated with Claim 1), the base carrier comprising a crawler belt having bushings each mounted between a pair of opposed links and a sprocket having a plurality of teeth meshing with the bushings respectively, each of the sprocket teeth having a welt overlay containing hard particles and composed of beads each running in a direction transverse to the rotating direction of the sprocket.

According to the invention, the overlaying direction of the sprocket teeth is a direction (which is generally equal to the direction of the tooth traces) transverse to the rotating direction of the sprocket, and therefore the direction (which is perpendicular to the tooth traces) of tensile stress imposed on the weld overlay when the sprocket comes in engagement with its mating member (i.e., bushings) is generally coincident with the direction (which is generally perpendicular to the beads) of cracking in the weld overlay. As a result, cracks can be prevented from opening, in other words, expanding. The weld overlay is preferably formed by forming narrow overlay beads so as to align successively in parallel. This stabilizes the quality of the overlay beads, namely, the amount and distribution of the hard particles and the structure and hardness of the matrix, which leads to the stable quality of the weld overlay. The overlaying direction transverse to the rotating direction of the sprocket contributes to an improvement in the initial conformity of the sprocket relative to the bushings when the sprocket comes in engagement with the bushings. When forming the overlay beads successively in parallel, the overlapped areas of the beads respectively assume a concave form. Excavated soil is entrapped and accumulated in this concave area, serving as an abrasive which makes a wear surface smooth at the initial stage of wear. If the unevenness of the weld overlay does not disappear at the initial wear stage, stresses will be concentrated on the concave areas so that cracks due to fatigue will be created, causing the problems mentioned earlier. It is understood from the foregoing description that these effects reach their culmination when the direction of the overlay beads is perpendicular to the rotating direction of the sprocket.

In the invention, the hard particles are preferably distributed in a less amount at the tip of each tooth than at the dedendum thereof and/or not contained at the end of the tip (this feature is associated with Claim 2). When the sprocket is in engagement with the bushings, the teeth of the sprocket elastically deform to a greater extent at the tip than at the dedendum. If the amount of deformation exceeds the allowable amount of deformation for the weld overlay, cracking will occur and develop in the weld overlay, leading to exfoliation. The more the hard particles are contained, the less the allowable deformation amount becomes, or the thicker the weld overlay containing the hard particles distributed therein are, the less the allowable deformation amount becomes. Accordingly, the hard particles are contained in a less amount in the area close to the tooth tip and are not contained at the tooth top, whereby exfoliation and chipping of the weld overlay can be prevented and, in consequence, the durability of the weld overlay can be stabilized.

Preferably, the hard particles are distributed in a more amount in the area intermediate between the dedendum and the tooth tip than at the dedendum and at the tooth tip (this feature is associated with Claim 3). With this arrangement, tenacity can be mainly imparted to the dedendum and the tooth tip while wear resistance can be mainly imparted to the area intermediate between the dedendum and the tooth tip, which leads to an improvement in the durability of the weld overlay.

It is preferable that the hard particles be contained in the weld overlay so as not to protrude from the surface of the weld overlay and so as to be densely distributed in the bottom area of the weld overlay (this feature is associated with Claim 4). Unless the hard particles protrude from the surface of the weld overlay, no damage will be given to the mating member to be engaged which would otherwise be scratched by the projecting hard particles. By densely distributing the hard particles at the bottom area of the weld overlay, in other words, by distributing the hard particles in a slight amount in the area near the surface of the weld overlay, the area near the surface of the weld overlay wears fast at the initial stage of wear so that the unevenness of the weld overlay can be removed to provide a smooth surface for engagement. This arrangement has the effect of eliminating, at an early stage, a source of stress concentration due to the unevenness of the surface of the weld overlay.

In the invention, the spacing between adjacent ones of the hard particles densely distributed in the bottom area of the weld overlay is preferably less than or equal to the size of the particles of soil to be entrapped (this feature is associated with Claim 5). The hard particles have higher wear resistance than the matrix (parent phase metal) which holds the hard particles. If the size of soil particles is smaller than the spacing between the hard particles, the matrix will wear in preference to the hard particles, so that the wear will progress with the hard particles projecting from the surface of the weld overlay. Such projecting hard particles will scrape the mating member off, expediting wear. By making the spacing between the hard particles less than or equal to the size of soil particles, the preferential wear of the matrix can be reduced, thereby lessening the projecting amount of the hard particles.

According to a second aspect (associated with Claim 6) of the invention, there is provided a base carrier for a tracklaying vehicle, the base carrier comprising a crawler belt having bushings each mounted between a pair of opposed links and a sprocket having a plurality of teeth meshing with the bushings respectively, wherein a weld overlay containing hard particles is formed on the outer peripheral surface of each of the bushings, the outer peripheral surface serving as a contact surface for the sprocket that engages with the bushings and wherein the core of each bushing is made of steel of high tenacity.

In the invention, the outer peripheral surface of each bushing is preferably provided with a hardened layer (this feature is associated with Claim 7).

A bushing used for the base carrier of a tracklaying vehicle is required to have wear resistance at its outer periphery as well as fatigue strength in order to withstand repetitive loads imposed on the bushing. According to the invention, wear resistance is imparted to the most wear-vulnerable area (i.e., the contact surface for the sprocket) of the bushing by forming a weld overlay containing hard particles in the area; the wear resistance and fatigue strength of other peripheral areas than the contact surface for the sprocket are improved by forming a hardened layer on the surface of the bushing; and the core of the bushing is formed from highly tenacious steel in order to improve the tenacity of the bushing itself and to prevent crack extension. As a guide, the hardness of the hardened layer on the bushing surface is preferably $H_{RC}$ 45 or more. The provision of the hardened layer on the bushing surface has the effect of preventing occurrence of cracking in the vicinity of the end (i.e., the area near the boundary between the weld overlay and the busing body) of the weld overlay.

The provision of the hardened layer has the effect of preventing the preferential wear of the area close to the end of the weld overlay. If there is provided no hardened layer, the area close to the end of the weld overlay will wear preferentially, being scooped away, which leads to a decrease in the strength of the bushing. As a result, the bushing sometimes is broken before the weld overlay fully exerts its wear resistance. Preferably, the core of the bushing has a quench tempered structure having a hardness of $H_{RC}$ 26 to 45 (this is a measure). If the hardness of the bushing core is lower than it, the bushing per se will be deformed into a flat shape. On the other hand, if the hardness is higher than it, cracks which have occurred in the weld overlay or in the area close to the end of the weld overlay will quickly extend to the base material, resulting in breakage.

In the invention, the weld overlay is preferably formed such that each bead extends in a direction transverse to the rotating direction of the sprocket (this feature is associated with Claim 8). By making the overlaying direction of the outer peripheral surface of the bushing transverse to the rotating direction of the sprocket, the direction of tensile stress imposed on the weld overlay (i.e., the circumferential direction of the bushing) when the bushing comes into engagement with the mating member, sprocket can be substantially coincident with the direction of cracking on the weld overlay (i.e., the direction perpendicular to the beads), so that the cracks can be prevented from opening, in other words, expanding. It is also preferable to form the weld overlay by arranging narrow overlay beads successively in parallel. With this arrangement, the quality of the overlay beads, that is, the amount and distribution of the hard particles and the structure and hardness of the matrix can be stabilized, so that the quality of the weld overlay can be stabilized. In addition, the direction of overlaying, which is transverse to the rotating direction of the sprocket, has the effect of improving initial conformity at the time of engagement of the bushing with the sprocket. As mentioned earlier, where the overlay beads are formed so as to alien successively in parallel, the overlapped areas of the adjacent beads are concave in form. Therefore, soil and sand are entrapped and accumulated in these areas and serve as an abrasive, making the wear surface smooth at the initial stage of wear. If the unevenness of the weld overlay is not eliminated at the initial wear stage, stresses will be concentrated on the concave areas, causing fatigue cracking which raises the above-described problems. As apparent from the foregoing description, these operational effects reach their culmination when each overlay bead is arranged so as to extend in a direction perpendicular to the rotating direction of the sprocket.

In the invention, the weld overlay is preferably so formed on each bushing as to extend circumferentially over a substantially half of the outer peripheral surface of the bushing, the outer peripheral surface engaging with the sprocket (this feature is associated with Claim 9). With this arrangement, wear resistance can be imparted only to the contact surface for the mating member, sprocket in engagement with the bushing. This reduces manufacturing cost, the amount of deformation that occurs during formation of the weld overlay and during thermal treatment, and thermal stress as well as transformation stress. In addition, occurrence of cracking can be prevented and the necessity for bore machining after formation of the weld overlay can be eliminated.

The hard particles are preferably contained in the weld overlay in such a manner that they do not come out from the surface of the weld overlay and are densely distributed in the bottom area of the weld overlay (this feature is associated with Claim 10). Unless the hard particles come out from the surface of the weld overlay, damage to the mating member due to scratching by these particles can be avoided. By densely distributing the hard particles in the bottom area of the weld overlay, in other words, by scarcely distributing the hard particles in the near surface area of the weld overlay, the near surface area of the weld overlay is allowed to be quickly worn away at the initial stage of wear, so that the unevenness of the surface of the weld overlap is removed, forming a smooth engagement surface. Accordingly, this has the effect of eliminating, at an early stage, a stress concentration source presented by the unevenness of the overlay surface, as mentioned earlier.

In the invention, the hard particles are preferably contained in the weld overlay so as to be distributed at spacings lees than or equal to the size of soil and sand to be entrapped (this feature corresponds to Claim 11). The hard particles has higher wear resistance than the matrix (parent phase metal) which holds the hard particles. If the size of soil particles is smaller than the spacing between the hard particles, the matrix will wear in preference to the hard particles, so that wear will progress with the hard particles projecting from the overlay surface. In consequence, the projecting hard particles scrape the mating member off, expediting wear. By making the spacing between the hard particles less than or equal to the size of soil particles, the preferential wear of the matrix can be reduced, thereby lessening the projecting amount of the hard particles.

In addition, the weld overlay is so formed that strip-like overlay beads containing the hard particles are aligned successively in parallel (this feature corresponds to Claim 12), or alternatively strip-like overlay beads containing the hard particles and strip-like overlay beads containing no hard particles are alternately successively aligned in parallel (this feature corresponds to Claim 13). In the case of the latter overlaying pattern, the weld overlay is also formed such that each bead extends in a direction transverse to the rotating direction of the sprocket teeth. Therefore, each strip-like overlay bead containing no hard particles is protected by the two strip-like overlay beads containing the hard particles which are located on both sides of the former bead, so that this overlay pattern functions satisfactorily. The latter pattern has the advantage that a less amount of hard particles is used, leading to a saving of cost.

According to a third aspect (associated with Claim 14) of the invention, there is provided a base carrier for a tracklaying vehicle, the base carrier comprising, in combination, the sprocket associated with the first aspect and the bushings associated with the second aspect.

According to this feature, the synergistic erect of the characteristics of the weld overlay applied to the sprocket and the weld overlay applied to each bushing provides a base carrier having more improved wear resistance and well suited for use in a bulldozer used for, for instance, mining of oil sand. The wear resistance characteristic of the weld overlay applied to the sprocket is equivalent to that of the weld overlay applied to each bushing and therefore, an undesirable event, that is, scraping of the mating member by the hard particles can be avoided and wear rate can be minimized more effectively than the case in which either the sprocket or the bushings are provided with a weld overlay.

The second object can be accomplished by a hard facing method for sprocket teeth according to a fourth aspect (associated with Claim 15) of the invention. This method is for applying a weld overlay to each of the tooth flanks of a sprocket having a plurality of teeth to produce a wear-resistant sprocket teeth, wherein overlaying is successively carried out such that each bead extends in a direction transverse to the rotating direction of the sprocket teeth and interpass temperature is controlled so as to make the amount of heat input for each tooth substantially constant during the overlaying.

According to the invention, the occurrence of cracking during weld overlay formation can be reduced. As to cracks which have already occurred, they can be prevented from opening, namely, extending, thanks to the arrangement in which the overlaying direction of the teeth of the sprocket is a direction (which is generally equal to the direction of the tooth traces) transverse to the rotating direction of the sprocket teeth, so that the direction (which is perpendicular to the beads) of cracking occurring in the weld overlay is generally coincident with the direction (which is perpendicular to the tooth traces) of stresses imposed on the weld overlay in service. In addition, the above arrangement makes it possible to improve the initial conformability of the sprocket teeth with respect to their mating members, the bushings and to let the weld overlay be smoothly worn. Further, overlaying passes are successively performed in a direction from each tooth tip to each dedendum ad interpass temperature is so controlled that the amount of heat input for every tooth during overlaying becomes substantially constant, so that the appearance of the beads can be smoothed and the occurrence of cracking due to the stress concentration on the concave portions formed on the surfaces of the beads can be prevented to stabilize the beads and, in consequence, the quality of the weld overlay. In this way, a further improvement in the wear resistance of the sprocket teeth can be achieved.

Preferably, overlaying is carried out in such a way that hard particles are added to a molten weld pool being formed on a base material of the sprocket teeth by means of an arc to form, on the base material, a weld overlay containing the hard particles (this feature is associated with Claim 16). This arrangement contributes to an improvement in the hardness of the molten metal, leading to improve wear resistance.

The combination of the supply of the hard particles and the control of the amount of heat input enables stabilization of the amount of the hard particles contained in the weld overlay, which leads to a further improvement in the quality of the weld overlay.

It is preferable to perform the overlaying of the invention with some latitude allowed in the grain size distribution of the hard particles for allowing dense charge with the hard particles (this feature is associated with Claim 17). According to this feature, the minimum grain size, which permits the presence of a large number of hard particles in a non-molten condition, is selected and some latitude is allowed in the grain size distribution. With this arrangement, small particles can get into the gaps between large particles which enables dense charge with the particles. As a result, the distance between the particles becomes extremely small, which reduces the unevenness of the wear surface caused by the projection of the particles in the case of steady wear.

An alternative preferred method for solving the problem of damage to a part itself or its mating member to smooth the wear surface as much as possible by preventing the projection of the hard particles is preferably designed such that cemented carbide is used as he hard particles and the components of the cemented carbide are allowed to melt into molten metal so that carbide precipitates over the entire area of a matrix surrounding the cemented carbide (this feature corresponds to Claim 18). Increases in the amounts of weld heat input increase the floating amount of the constituents of the hard particles, causing precipitation of double carbide, Fe—W—C within the matrix. Therefore, the hardness of the matrix increases, while the hardness of the cemented carbide decreases because of deterioration. The difference in hardness between the matrix and the hard particles is, accordingly, reduced. In such a weld overlay, the matrix and the hard particles wear at the substantially same wear rate so that a smooth wear surface with no hard particles protruding therefrom can be attained. Thus, the foregoing problem can be solved.

The overlaying of the invention is preferably carried out while the amount of hard particles to be supplied being controlled such that the hard particles are not contained in the tooth tip (this feature corresponds to Claim 19). This arrangement prevents, without fail, exfoliation and chipping of the weld overlay at the tooth tip which would occur due to a collision between the base material at the tooth tip and its mating member and due to elastic deformation.

The overlaying of the invention is preferably carried out while overlaying rate or the amount of hard particles to be supplied being controlled such that the weld overlay formed near the tooth tip becomes thin or alternatively such that the hard particles contained in the weld overlay near the tooth tip become scarce (this feature corresponds to Claim 20). With this arrangement, exfoliation of the weld overlay at the tooth tip can be prevented.

In the invention, it is preferable to apply quench/tempering and preheating to the sprocket teeth prior to overlaying (this feature corresponds to Claim 21). It is also preferable to carry out postheating after overlaying, for alleviating surface residual stresses imposed on the sprocket teeth (this feature corresponds to Claim 22). According to this feature, the hardness of the base material can be increased. Additionally, tensile residual stresses generated during the formation of the weld overlay can be alleviated by carrying out preheating and postheating. In consequence, cracking that would occur throughout the entire weld overlay because of the residual stresses can be avoided.

In the invention, after overlaying, weld deformation which occurred in the sprocket teeth may be corrected and press quenching may be carried out to remove portions affected by weld heat (this feature corresponds to Claim 23). With this arrangement, it is possible to easily correct, by press quenching, deformation which occurred during overlaying, so that the sprocket teeth can be mounted by correctly abutting its surface on the mating member, in other words, deformation attributable to attachment looseness and occurring during operation can be prevented. In addition, a brittle, heat-affected structure including coarsened crystal grains and formed in overlaying can be eliminated. As a result, the fatigue strength of the sprocket teeth can be improved.

The third object of the invention can be accomplished by a hard facing method for bushings according to a fifth aspect (associated with Claim 24) of the invention. This method is for applying a weld overlay to the outer peripheral surface of a bushing to produce a wear-resistant bushing, the inner and outer peripheral surfaces of the bushing having been subjected to machining, the method comprising:

(a) a weld overlay formation step for supplying hard particles to a molten weld pool being formed on a base material of the bushing by use of an arc to form a weld overlay containing the hard particles on the base material;

(b) a first thermal treatment step for applying gas carburization to the bushing on which the weld overlay has been formed; and (c) a second thermal treatment step for applying reheating/quenching and tempering to the busing after the first thermal treatment step.

According to the hard facing of the invention for a bushing, in the weld overlay formation step, a weld overlay containing hard particles is firstly formed on the base material of a bushing by forming a molten weld pool on the base material of the bushing by use of an arc while supplying the hard particles to the molten weld pool. Then, in the first thermal treatment step, the bushing after the weld overlay formation is subjected to gas carburization. In the second thermal treatment step, the bushing is reheated, quenched and then tempered. Instead of these steps, a consecutive thermal treatment step may be employed in which quenching is performed immediately after gas carburization without reheating. By applying the thermal treatment to the bushing after the formation of the weld overlay, fine spherical carbide granules are uniformly dispersed on the upper part of the matrix of the weld overlay because of carbon which has penetrated from outside during carburization. In addition, fine martensite is dispersed by quenching thereby obtaining increased hardness and therefore a structure of increased wear resistance. On the lower part of the matrix, wear resistance is enhanced by the hard particles and carbon floating from the hard particles develops into carbide so that a structure of increased wear resistance can be obtained. In the case of "intermetallic wear parts" such as bushings which have a metal-to-metal contact relationship with their mating parts, it is preferred that the size of the hard particles be smaller than that of soil and sand. The reason for this is that if the size of the hard particles is larger than that of soil and sand, the matrix between the hard particles is preferentially scraped off by soil and sand so that the hard particles project from the wear space, resulting in falling off of the hard particles or scraping off of the mating parts. To improve the wear resistance of the matrix of the weld overlay is also important particularly for "intermetallic wear parts". If the wear resistance of the matrix is considerably lower than that of the hard particles, the matrix will preferentially wear and the hard particles will project from the wear surface. Hence, in the invention, the matrix of the weld overlay is reinforced and the sufficient hardness of the base material is ensured by adapting the thermal treatment subsequent to the formation of the weld overlay whereby a bushing excellent in wear resistance as well as in fatigue strength can be attained.

According to a sixth aspect (associated with Claim 25) of the invention, there is provided a hard facing method for bushings, which method is for applying a weld overlay to the outer peripheral surface of a bushing to produce a wear-resistant bushing, the inner and outer peripheral surfaces of the bushing having been subjected to machining, the method comprising:

(a) a weld overlay formation step for supplying hard particles to a molten weld pool being formed on a base material of the bushing by use of an arc to form a weld overlay containing the hard particles on the base material;

(b) a first thermal treatment step for applying non-oxidative heating/oil hardening and tempering to the bushing on which the weld overlay has been formed; and (c) a second thermal treatment step for carrying out, subsequently to the first thermal treatment step, inner-peripheral-surface hardening and tempering, the inner-peripheral-surface hardening being carried out in such a manner that the inner peripheral surface of the bushing is subjected to induction heating while the outer peripheral surface thereof being cooled.

According to the hard facing of the invention for bushings, in the weld overlay formation step, a weld overlay containing hard particles is firstly formed on the base material of a bushing by forming a molten weld pool on the base material of the bushing by use of an arc while supplying the hard particles to the molten weld pool. Subsequently, in the first thermal treatment step, the bushing after the weld overlay formation is subjected to non-oxidative heating, oil hardening and then tempering. In the second thermal treatment step, inner-peripheral-surface hardening is performed in such a way that the inner peripheral surface of the bushing is induction-heated, while its outer peripheral surface being cooled, and finally, tempering is performed. With this hard facing method, a bushing having improved wear resistance and fatigue strength which are equivalent to those of the bushing of the first aspect can be achieved.

In the fifth and sixth aspects of the invention, the weld overlay formation is carried out with some latitude in the grain size distribution of the hard particles for allowing dense charge with the hard particles (this feature corresponds to Claim 26). Soil and sand entrapped between the parts are ground in an order of several $\mu$m, whereas it is impossible in view of the process to shorten the spacing between the unmolten, hard particles to the extent equivalent to the above size because the hard particles will be mostly melted in doing so. Therefore, the invention is arranged such that the minimal grain size, which allows the presence of a large number of hard particles in an unmolten state, is selected and some latitude is allowed in the grain size distribution in order to let small particles penetrate into the gaps between large particles. With this arrangement, the base material can be more densely charged with the hard particles, thereby making the spacing between the particles extremely small. As a result, the unevenness of the wear surface due to the projection of the particles in steady wear can be reduced.

As an alternative method for solving the problem of chipping of a part and damage to its mating member to obtain a smooth wear surface by preventing the projection of the hard particles, it is preferable for the fifth and sixth aspects of the invention to use cemented carbide as the hard particles and to allow the components of the cemented carbide to melt into molten metal thereby precipitating carbide over the entire area of the matrix surrounding the cemented carbide (this feature corresponds to Claim 27). As the amount of weld heat input increases, the amount of components of the hard particles to be melted out increases so that double carbide, Fe—W—C precipitates in the matrix increasing the hardness of the matrix, while the cemented carbide decreases in hardness because of deterioration. As a result, the difference in hardness between the matrix and the hard particles is reduced. In such a weld overlay, the matrix and the hard particles wear at the substantially same rate and as a result, the hard particles do not project, a smooth wear surface is attained, and therefore the foregoing problem can be solved.

For imparting a desired hardness to the base material, it is preferable to use a substance having good hardenability. On one hand, good hardenability is advantageous, but, (in the other hand, good hardenability is likely to cause cold cracking after formation of a weld overlay. To prevent cold cracking, it is preferable for each aspect of the invention to carry out preheating in which the bushing is heated to a predetermined temperature (e.g., 250° C. or more before forming the weld overlay (this feature corresponds to Claim 28).

In each aspect of the invention, there is no cracking problem in the case where the first thermal treatment process starts immediately after the weld overlay formation step. However, there is a high probability of cracking due to tensile residual stress generating in the weld overlay formation step in the case where the bushing is once cooled after the weld overlay formation step and particularly in the case where a preheating treatment is not applied before the weld overlay formation step. This residual stress increases with decreases in temperature from 500° C. or less at which plastic deformation is unlikely to occur. Therefore, if no preheating treatment process is adapted, the difference in yield between the weld overlay and the base material is significant and therefore residual stress increases sharply, so that residual stress exceeds its breaking stress point, accompanied with cracking at an early stage after the formation of the weld overlay. This cracking occurs, with a large opening, transversely to the beads in a direction perpendicular to the direction of welding. Where a preheating treatment process is adapted, residual stress increases slowly and reaches its breaking stress point after temperature drops. Therefore, cracking accompanied with a large opening scarcely occurs but a number of minute cracks are created over the entire weld overlay. For preventing this, it is preferable to carry out post heating in which the bushing is heated to a predetermined temperature (e.g., 350° C.) after the weld overlay formation step (this feature corresponds to Claim 29). The provision of the post heating treatment process after the weld overlay formation step alleviates residual stress and prevents occurrence of minute cracks.

In each aspect of the invention, press-fit-portion grinding, end face grinding, and end face burnishing may be applied to the outer peripheral surface of the bushing as finishing after the second thermal treatment step (this feature corresponds to Claim 30). With this arrangement, the desired finished product which has undergone surface finishing can be obtained.

BRIEF DESCRIPTION OF THE DRAWINGS

FIG. 6(a) is a diagram showing the order of overlaying according to an embodiment, FIG. 6(b) is a diagram showing the direction of overlaying and FIG. 6(c) is a diagram showing the condition of a weld overlay formed in the area close to a tooth tip.

FIG. 24 is a distribution chart showing the cross section hardness distribution of a base material according to Example 4.

FIGS. 25(a), 25(b), 25(c) and 25(d) show cracking conditions and the values of residual stresses imposed on the outer peripheral surface of the base material after oil hardening/tempering according to Example 4.

BEST MODE FOR CARRYING OUT THE INVENTION

Figure 1:
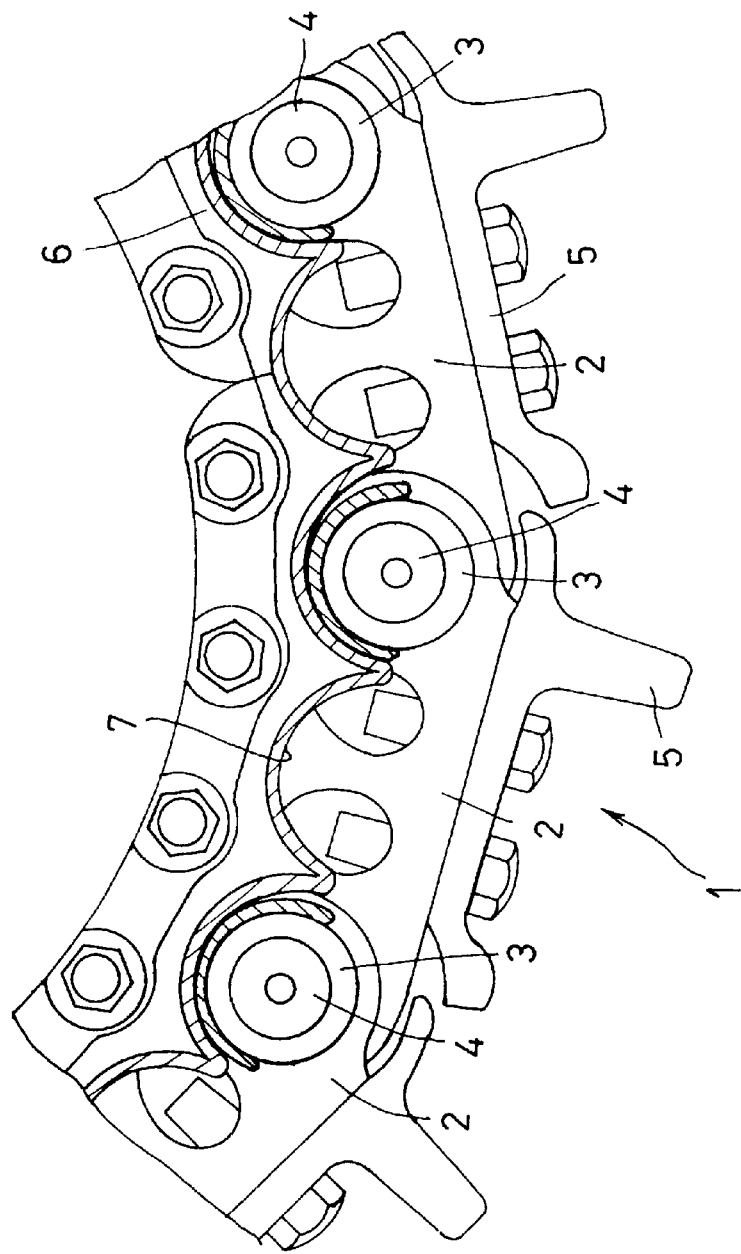
FIG. 1 is a partly enlarged sectional view of a base carrier for a bulldozer according to one embodiment of the invention.

Referring now to the drawings, base carriers for a tracklaying vehicle and hard facing methods for a base carrier will be concretely described according to embodiments of the invention.

FIG. 1 is a partly enlarged sectional view of a base carrier for a bulldozer according to one embodiment of the invention.

In the present embodiment, a crawler belt 1 is comprised of a link chain and a track shoe 5 secured to the link chain. The link chain is formed such that an end of each of bushings 3 is forced into each hole defined by the respective ends of a pair of opposed links 2 and the ends of a crawler pin 4, which pierces through the bushing 3, are forced into the front and rear links 2. The crawler belt 1 is wound around a sprocket 6 and an idler (not shown). When the sprocket 6 is put in operation, a tooth space 7 of the sprocket 6 comes into engagement with the bushing 3 which in turn moves and slips on the tooth flank of the sprocket 6 thereby rotating the crawler belt 1 to allow traveling of the bulldozer.

During a travel of the bulldozer, soil and sand are entrapped between each tooth flank of the sprocket 6 and each bushing 3 so that the sprocket 6 and the bushings 3 are used in a repetitive slip-contact relationship, and therefore, the respective surfaces of the sprocket 6 and the bushings 3 are used in a condition where they are extremely liable to wear. In such an instance, a solution is normally found in applying weld overlays to the teeth of the sprocket 3 and the outer peripheral surface of each bushing 3 at desired positions to achieve increased wear resistance.

Figure 2:
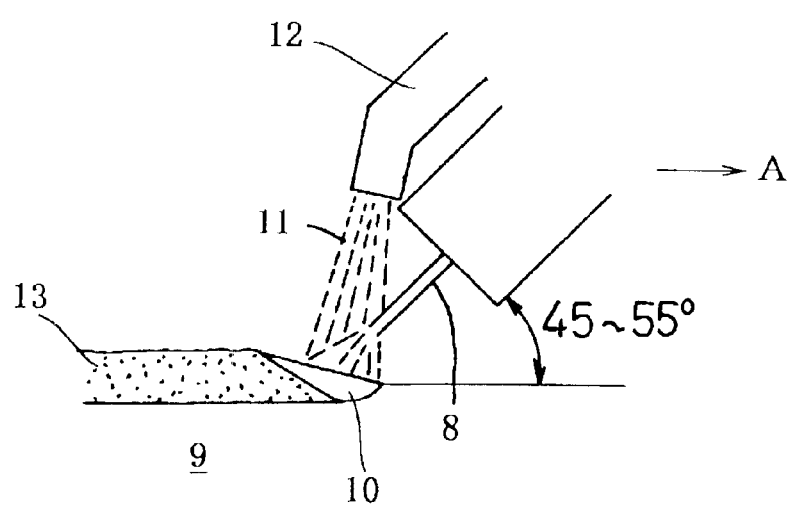
FIG. 2 is an explanatory diagram of a weld overlay forming mechanism.

For forming a weld overlay, an arc electrode 8 constituted by a weld wire (e.g., "KC-50" produced by Kawasaki Steel Corporation) is arranged as shown in FIG. 2 so as to incline at a predetermined torch angle (=45° to 55°) with respect to the surface of a horizontally disposed, base material 9. The welding area is supplied with carbon dioxide which serves as a shielding gas, while hard particles 11 (which are, for example, wear-resistant particles constituted by cemented carbide such as WC—Co and will be hereinafter simply referred to as "wear-resistant particles") being fed, through a nozzle 12, to a molten weld pool 10 formed by an arc generated between the arc electrode 8 and the base material 9. Such welding is carried out at a predetermined rate in the direction designated by arrow A, whereby a weld overlay 13 is formed on the base material 9. In this case, a preferable arrangement is made such that the wear-resistant particles 11 are dropped just above the arc an are not dropped to an area short of the arc, in order to disallow the wear-resistant particles 11 to protrude from the weld overlay 13 and to densely, uniformly distribute the wear-resistant particles 11 at the bottom area the weld overlay 13.

Now, overlaying methods for the sprocket 6 and for the bushing 3 will be respectively described in detail.

(1) An Overlaying Method for the Sprocket 6

Figure 3:
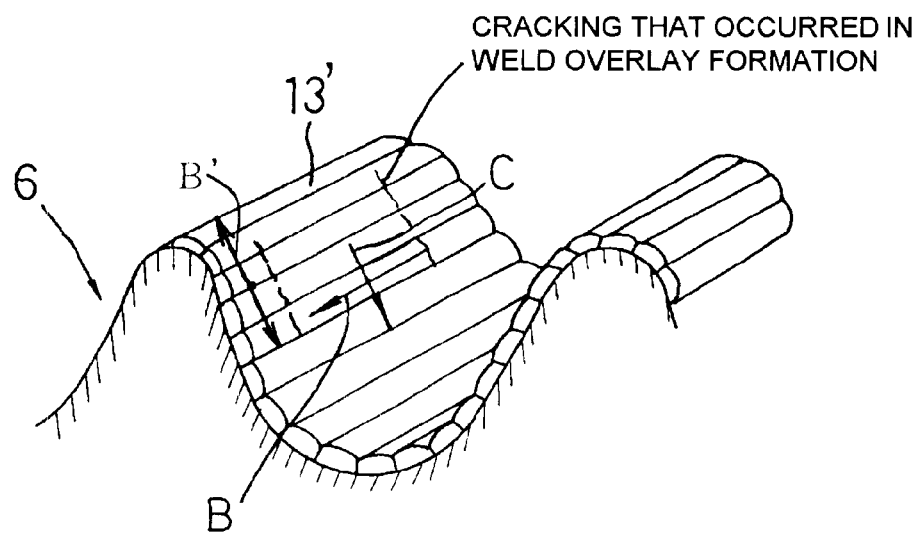
FIGS. 3(a) and 3(b) are explanatory diagrams each showing the condition of a weld overlay formed on a sprocket.
Figure 3:
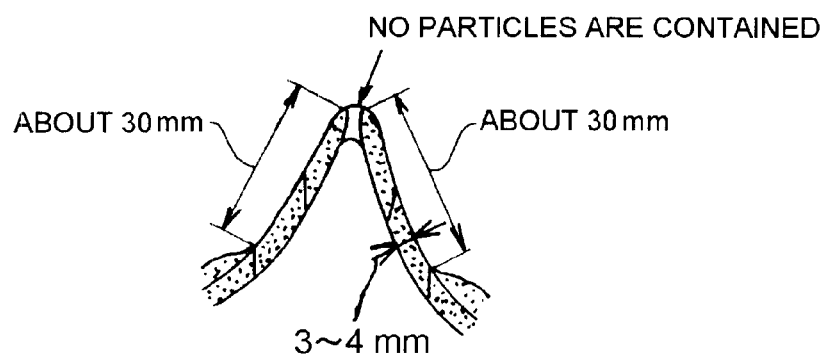

For overlaying a tooth of the sprocket 6, a weld overlay is entirely applied to the contact face (for the bushing 3) and tip of the sprocket tooth, in such a manner that each bead runs in a transverse direction or, more preferably, in a perpendicular direction (indicated by arrow B) with respect to the rotating direction of the sprocket 6, as shown in FIG. 3(a). In order to obtain a uniform bead appearance and stabilize the quality of the weld overlay, it is preferable to successively for parallel overlay beads in the direction (indicated by arrow C) from the tip to the dedendum. This is because if overlay beads are applied in the direction opposite to arrow C, that is, the direction from the dedendum to the tooth tip, the heat of welding will accumulate on the base material, heating the tooth tip to a high temperature with changes in the depth of fusion, in the particle content and particle distribution of the weld overlay, and in the structure of the base metal. As a result, the continuous formation of overlay beads can no longer be carried out. Preferably, the height (3 to 4 mm) of excess weld metal in the area near the tooth tip (the area extending from the tooth tip to the point about 30 mm away from the tooth tip) is made to be lower than that in other areas as shown in FIG. 3(b) and no wear-resistant particles are added to the top of the tooth for the purpose of preventing chipping of the weld overlay. In addition, it is preferable to supply the wear-resistant particles to the area intermediate between the dedendum and the tooth tip in a more amount than the amounts of wear-resistant particles respectively supplied to the dedendum and to the tooth tip.

As explained earlier, by specifying the distribution of the overlay beads and the distribution of the wear-resistant particles, the sprocket teeth can be made such that the dedendum and tooth tip are mainly provided with tenacity whereas the area intermediate between the dedendum and the tooth tip is mainly provided with wear resistance. Therefore, exfoliation and chipping of the tooth tip can be prevented, thereby stabilizing the durability of the weld overlay. In the weld overlay, cracking sometimes occurs in a direction perpendicular to the beads as shown in FIG. 3(a) in the process of weld overlay formation. The direction of cracking coincides with the direction (indicated by arrow B') of tensile stresses generated when the sprocket and the bushings are brought into engagement with each other so that the opening of the crack is prevented from expanding.

Preferably, the wear-resistant particles supplied to the molten weld pool have small diameters of 0.1 to 1.0 mm and are densely distributed. In addition, the wear-resistant particles are allowed to submerge in the lower part of the weld overlay. With this arrangement, an area containing no wear-resistant particles can be formed on the surface layer of the weld overlay to ensure the initial conformability of the sprocket tooth when it comes into engagement with its mating member, the bushing 3. In the lower part of the matrix of the weld overlay, the spacing between the wear-resistant particles is 0.1 mm or less and a large amount of eutectic carbide precipitates owing to melting out of the wear-resistant particle components, which prevents the projection of the wear-resistant particles and brings about improved wear resistance.

(2) An Overlaying Method for the Bushing 3

Figure 4:
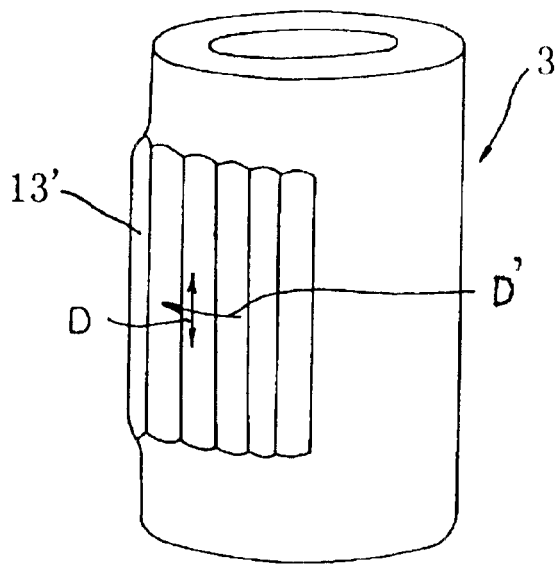
FIGS. 4(a), 4(b) and 4(c) are explanatory diagrams each showing the condition of a weld overlay formed on a bushing.
Figure 4:
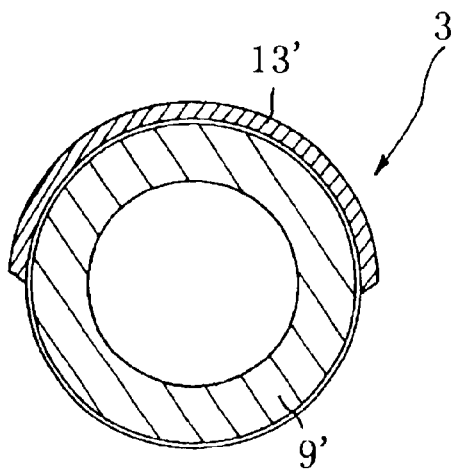
Figure 4:
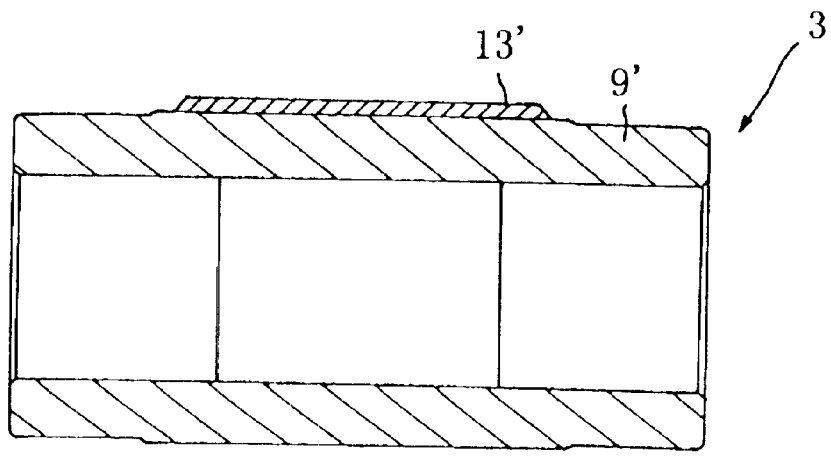

For overlaying the outer peripheral surface of the bushing 3, a weld overlay is applied so as to circumferentially extend over a substantially half of the outer peripheral surface (serving as a contact surface for the sprocket 6) of the bushing 3, overlaying being carried out in such a manner that each bead extends in a transverse direction or, more preferably, in a perpendicular direction (indicated by arrow D) with respect to the rotating direction (the sliding direction of the bushing indicated by arrow D' in FIG. 4(a)) of the sprocket 6, as shown in FIG. 4. If a weld overlay is applied to the entire outer peripheral surface of the bushing 3, thermal stress and transformation stress generated during formation of the weld overlay cannot escape so that they cause deformation of the base material or cracking. On the other hand, if a weld overlay is applied only to the requisite area like the case of the present embodiment, the base material does not need to undergo bore machining after the formation of the overlay. The area to which a weld overlay is applied is not limited to a substantially half of the outer peripheral surface (i.e., a circumferential area through an angle of 180°) such as described in the present embodiment, but may be the irreducible minimum of an angular area (i.e., a circumferential area through an angle of e.g., 120°).

Similarly to the case of the sprocket 6, a preferable arrangement is such that the wear-resistant particles supplied to the molten weld pool have small diameters of 0.1 to 1.0 mm and are densely distributed. Additionally, the wear-resistant particles are allowed to submerge in the lower part of the weld overlay. With this arrangement, it becomes possible to ensure the initial conformability of the bushing 3 relative to its mating member, the sprocket 6 when they come into engagement with each other. In the lower part of the matrix of the weld overlay, a large amount of eutectic carbide precipitates owing to meltin out of the wear-resistant particle components, which brings about improved hardness and wear resistance.

While strip-like overlay beads containing wear-resistant particles are successively formed in parallel in the foregoing embodiment, an alternative arrangement is made such that strip-like overlay beads containing wear-resistant particles and strip-like overlay beads containing no wear-resistant particles are alternately successively formed in parallel, and the outermost sides (both ends) are provided with strip-like overlay beads containing wear-resistant particles. The latter arrangement reduces the amount of wear-resistant particles to be uses, leading to a saving of cost. In this arrangement, the strip-like weld overly beads containing wear-resistant particles located on both outermost sides protect strip-like overlay beads containing no wear-resistant particles centrally located so that satisfactory functions can be attained.

There will be explained a hard facing a method for a sprocket tooth and a hard facing method for a bushing according to preferred embodiments of the invention.

(1) Hard Facing Method for Sprocket Teeth

EXAMPLE 1

Figure 5:
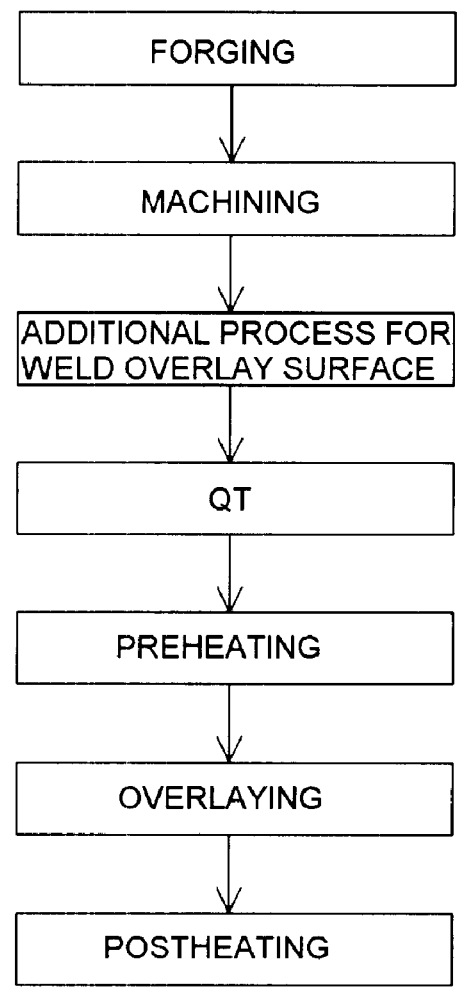
FIG. 5 is a flow chart of a process for sprocket teeth according to an embodiment of the invention.

In this example, the process shown in FIG. 5 is adapted for hard facing sprocket teeth. Specifically, after applying an additional process to the surface of the weld overlay subsequently to forging and machining, quenching (press quenching) and tempering were carried out. Since it had been found from the calculation based on the chemical components of the base material that the lowest temperature at which cold cracking did not occur was 139° C. to 182° C., preheating temperature was set to 200° C. and welding was carried out with the temperature of the overlay surface being 150° C. or more. For caution's sake, post heating was carried out at 200° C. for 4 hours. As the base material, SMnB435H having the chemical components shown in TABLE 1 was used.

TABLE 1

THE CHEMICAL COMPONENTS OF THE BASE MATERIAL (wt %)

| TYPE OF STEEL | C | Si | Mn | P | S | Cr | B | CE I(&) | CEN(%) |
|---|---|---|---|---|---|---|---|---|---|
| SMnB435H | 0.32 TO 0.37 | 0.15 TO 0.35 | 1.2 TO 1.5 | 0.03 OR LESS | 0.03 OR LESS | 0.03 OR LESS | 0.0005 TO 0.005 | 0.723 TO 0.898 | 0.529 TO 0.666 |

For applying a weld overlay to the surface of the base material, the molten weld pool was formed by an arc while wear-resistant particles being added to the molten weld pool so that a well overlay containing wear-resistant particles was formed on the base material. The diameter of the wear-resistant particles to be added preferably ranges from 0.1 to 1 mm, for the reason that smaller particles can be let the gap between larger particles for allowing dense charge with the particles. In this case, it is necessary to submerge the wear-resistant particles as deep as possible to make the beads smooth. For this purpose, a welding wire having low viscosity was used.

Overlaying conditions adapted in this example are as follows.

(1) welding current: 220A (2) welding voltage: 28V (3) the supply of wear-resistant particles 130 g/min.

(4) torch attitude: the torch is arranged so as to drop wear-resistant particles to a position just above the arc and not to drop them just before the arc (see FIG. 2)

(5) Interpass temperature is adjusted to 150° C. to 250° C. In cases where interpass temperature is lower than 150° C., a propane burner is used for heating. If interpass temperature is 250° C. or more, cooling is allowed to make the temperature fall in the above range.

(6) overlaying order: Overlaying is carried out in the order indicated by numerals in FIG. 6(a). Specifically, the tip of each tooth is first overlaid, and then overlaying of the tooth flanks is carried in such a way that adjacent tooth flanks are not linked to each other in order to reduce the fluctuation of interpass temperature. In each tooth flank, an overlaying pass is performed in a direction perpendicular to the rotating direction of the sprocket teeth (see FIG. 6(b)) and such a pass is successively made in a direction from the tooth tip to the dedendum. As seen from FIG. 6(c), the height (4 mm or less) of excess weld metal in the area near the tooth tip (the area extending from the tooth tip to the point about 30 mm away from the tooth tip) is lower than that of other areas and no wear-resistant particles are supplied to the tooth top for prevention of cracking of the weld overlay.

Figure 7:
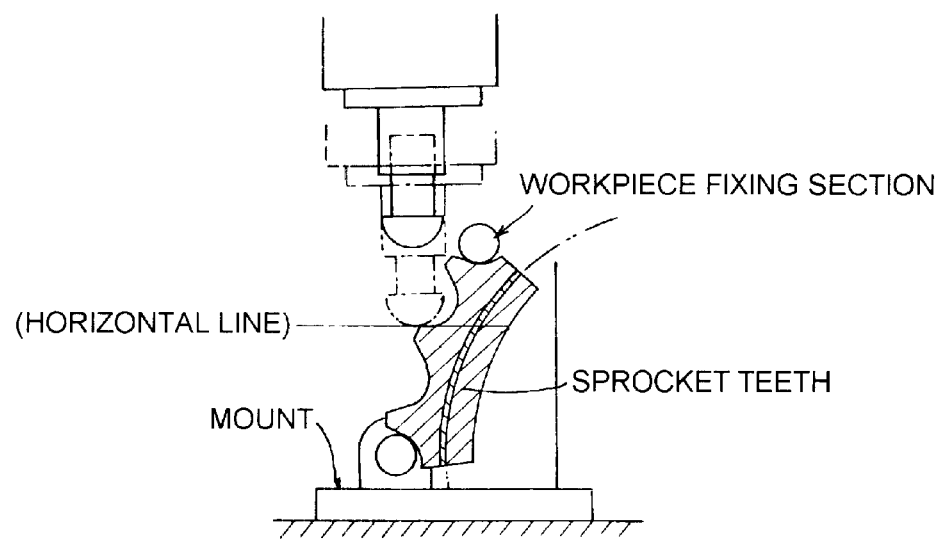
FIG. 7 is a diagram showing a repetitive drop weight testing machine.

For checking the strength of the sprocket teeth which were subjected to thermal treatments and overlay in, a repetitive drop weight test was conducted. In this test, a tester such as shown in FIG. 7 was used and an impact load of 1.05 W (=100 ton) was repeatedly exerted on the point 20 mm distant from the tooth tip.

As the result of the test, the tooth tip was broken after applying the load for 9,000 times but no exfoliation was found in the weld overlay on the tooth tip. The quality of the weld overlay was proved to be acceptable for wear-resistant sprocket teeth and satisfied the criteria used in exfoliation/cracking judgements.

Figure 8:
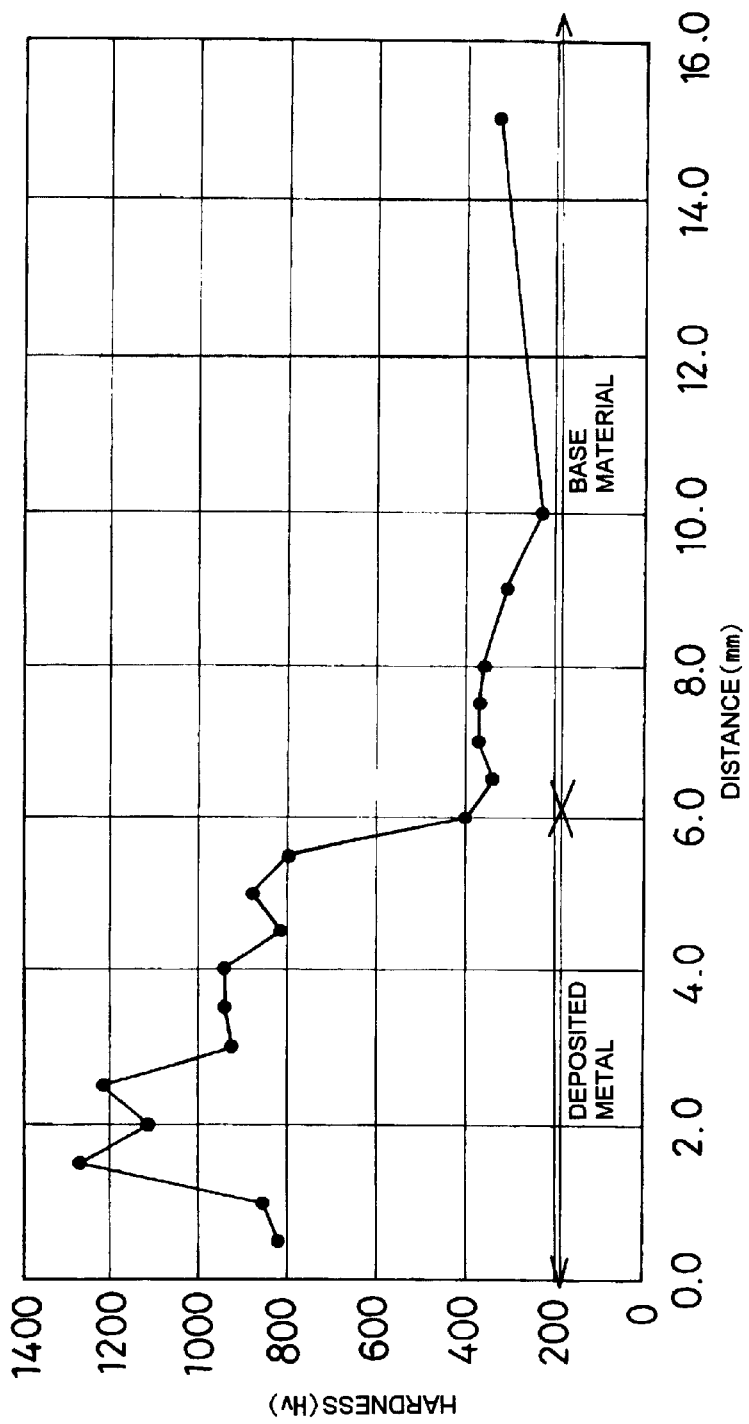
FIG. 8 is a graph showing the hardness distribution of a weld overlay according to Example 1.
Figure 9:
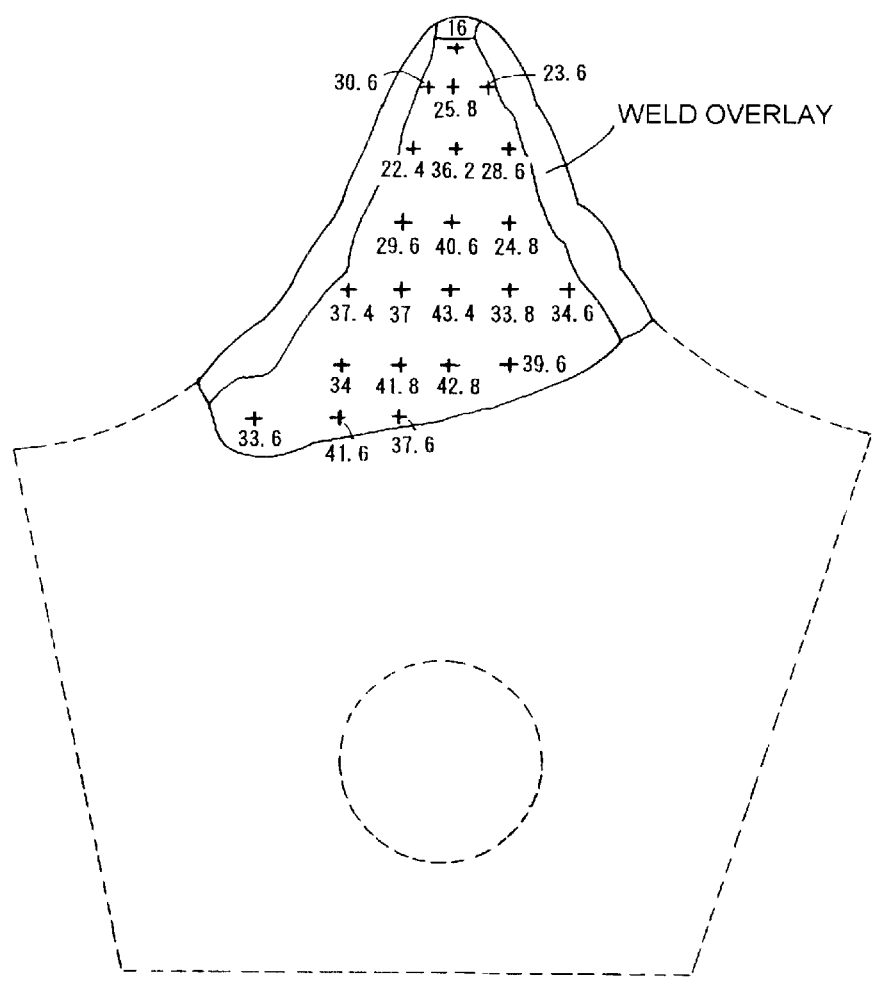
FIG. 9 is a distribution chart showing the hardness distribution of a sprocket tooth according to Example 1.
Figure 10:
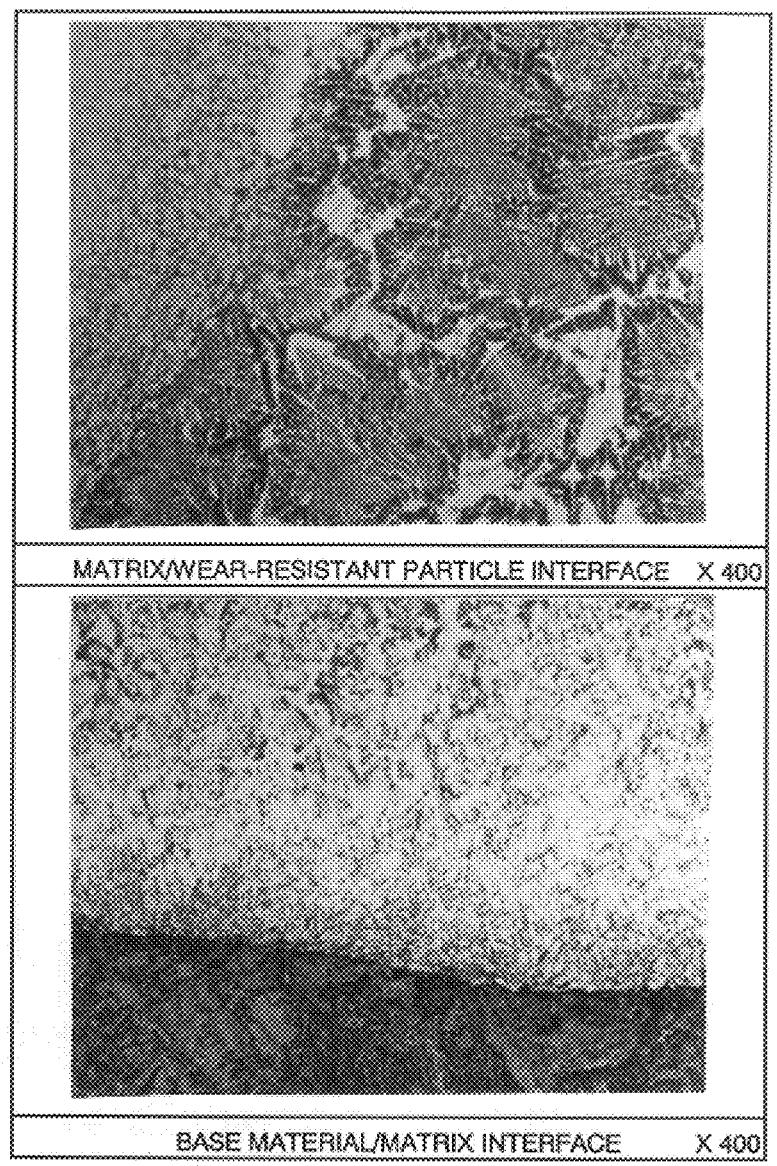
FIGS. 10(a) and 10(b) are microphotographs showing the metallographic structure of the weld overlay of Example 1.

FIG. 8 and FIG. 9 show the hardness distribution ($H_V$ values) of the weld overlay and the hardness distribution ($H_{RC}$ values) of the cross section, respectively. FIGS. 10(a) and 10(b) show microphotographs of the metallographic structure of the weld overlay. It is obvious from these figures that the amount of wear-resistant particle components (such as tungsten and carbon) melting into the matrix of the weld overlay is increased by increasing the amount of weld heat input and a large amount of eutectic carbide precipitates in the entire area of the matrix, leading to an increased hardness of $H_V$ 800 to 940. The lower part of the matrix contains precipitated carbide more than the upper part thereof and therefore has a structure of higher hardness.

Figure 11:
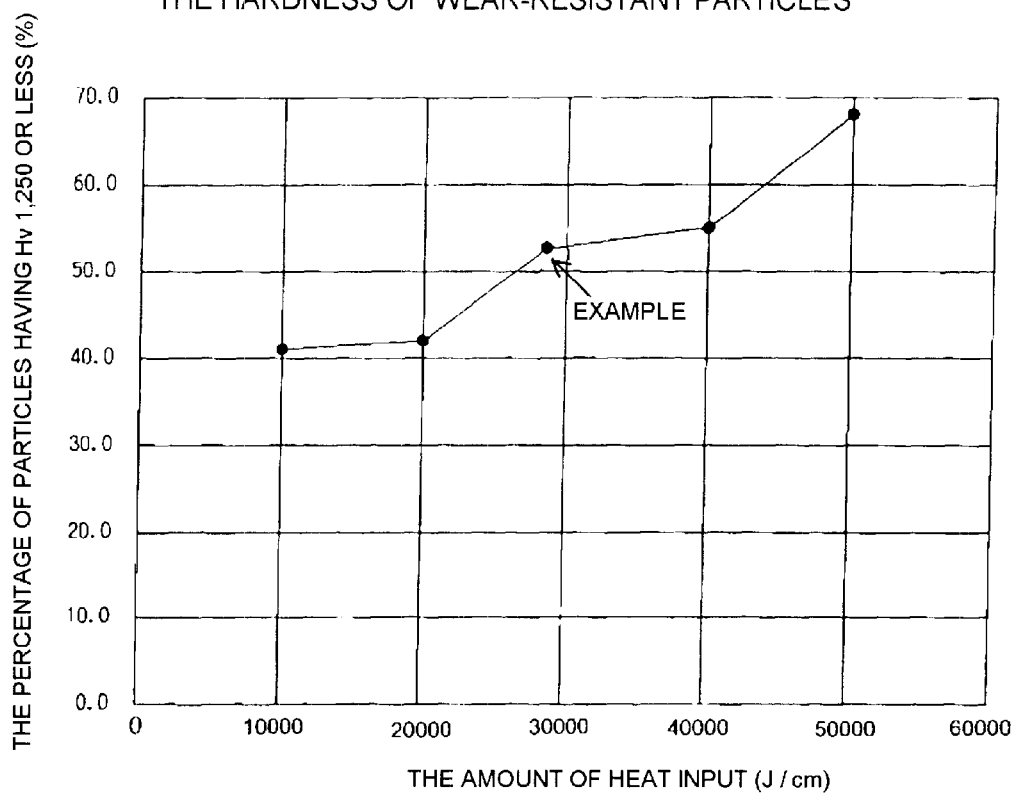
FIG. 11 is a graph showing the influence of the amount of weld heat input upon the hardness distribution of wear-resistant particles.

FIG. 11 shows the result of an experiment conducted for checking the influence of the amount of weld heat input upon the hardness of the wear-resistant particles. As seen from this graph, more than a half of the particles can be adjusted to $H_V$ 1,250 or less by adjusting the amount of weld heat input to a value proximate to 28,000 J/cm, so that the difference in wear resistance between the wear-resistant particles and the matrix is lessened. This allows the wear-resistant particles and the matrix to wear at the substantially same rate so that as smooth wear surface can be obtained. The distribution of wear-resistant particles as well as the amount of melting-out components of the wear-resistant particles can be stabilized by controlling the amount of heat input and, in consequence, the structure of the weld overlay can be stabilized.

In this embodiment, by controlling interpass temperature to be substantially constant, the appearance of the beads can be smoothed and starting points for stress concentration can be prevented from arising on the bead surface.

EXAMPLE 2

Figure 12:
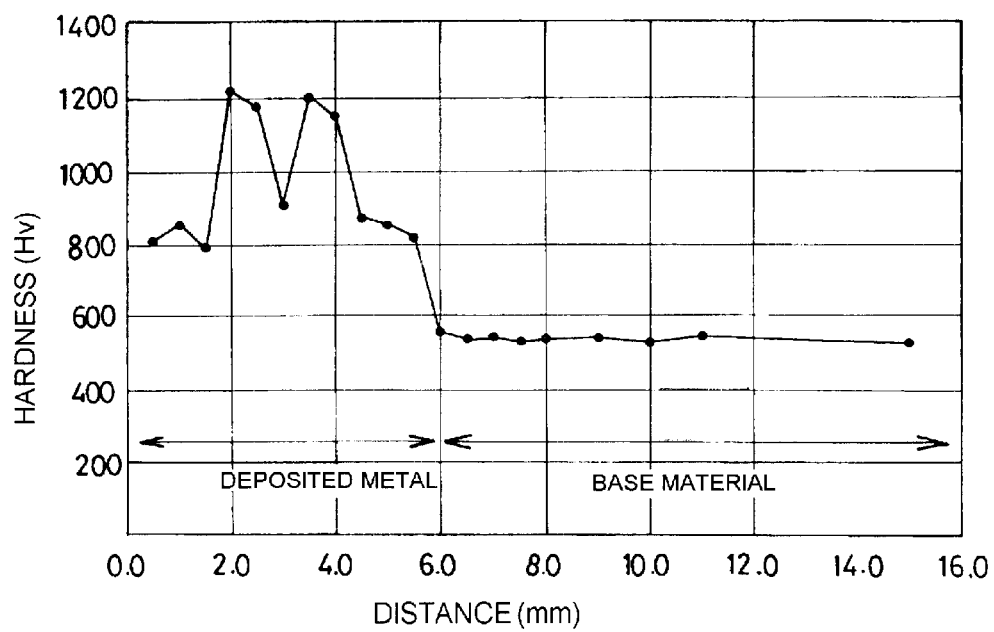
FIG. 12 is a graph showing one example of the hardness distribution obtained when press quenching was applied after overlaying (Example 2).
Figure 13:
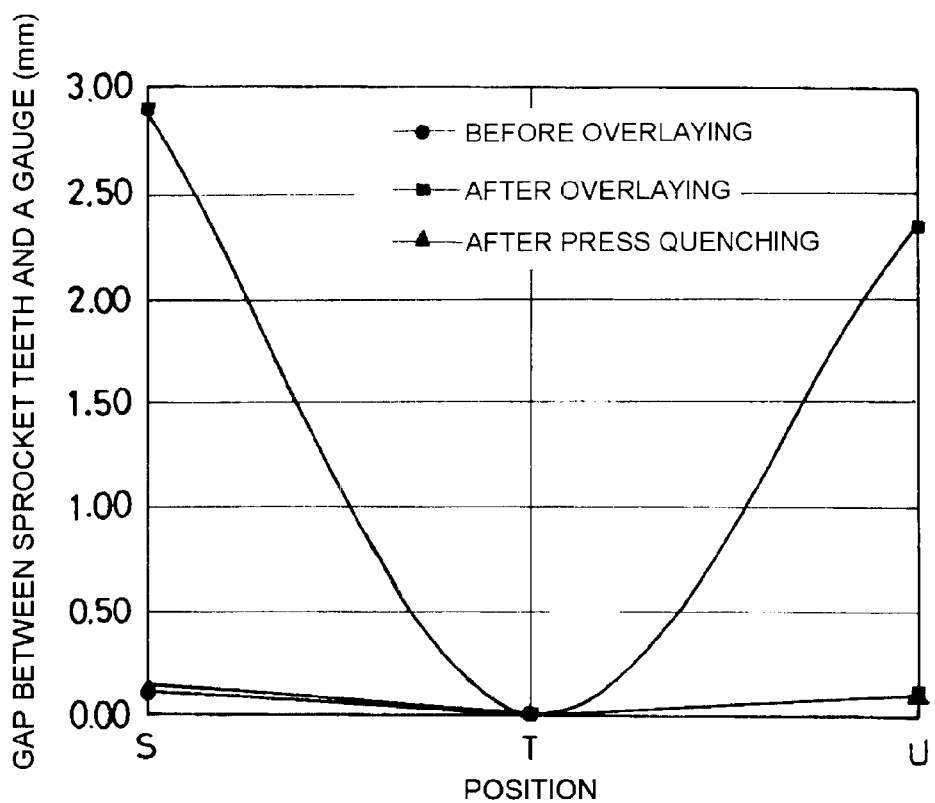
FIGS. 13(a) and 13(b) show, for comparison purpose, the curving amount of sprocket teeth when press quenching was applied after overlaying.
Figure 13:
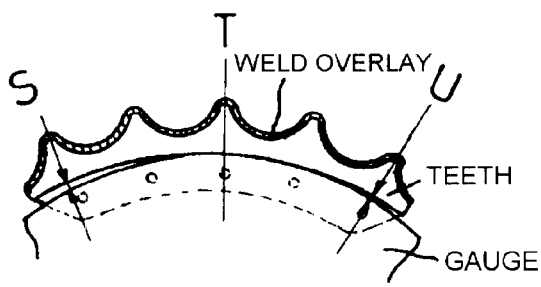

In this example, the sprocket teeth were subjected to press quenching after overlaying in the process shown in FIG. 5. FIGS. 12 and 13 show the hardness distribution of this example and the result of a test for checking the curving amount of sprocket teeth, respectively. As shown in FIG. 13(b), this curving amount checking test was conducted in such a way that a gauge was put to a circular arc face of the sprocket teeth to measure the gaps S and U at the ends thereof.

A region affected by overlaying heat was formed extending ten-odd mm in the direction of depth from the boundary between the weld overlay and the base material. The hardness of this region was lower than the original hardness of the base material, that is, the hardness obtained after quenching and tempering. The crystal grains in this region were coarsened. It is seen from FIG. 12 that when carrying out press quenching after overlaying, the hardness of the heat-affected region (the region extending in the direction of depth from the point of 6 mm in FIG. 12) was stabilized at about $H_V$ 540 which was equal to the hardness obtained after quenching and tempering. This means that the heat-affected region completely disappeared. Therefore, the strength of the base material increased, leading to improved fatigue strength. As understood from FIG. 13, deformation which had occurred in overlaying was corrected by press quenching so that the sprocket teeth could be mounted by correctly abutting its surface on the mating member and the possible occurrence of deformation due to attachment looseness in operation could be avoided.

Comparative Example 1

A test was conducted under the following overlaying conditions, using the same base material and same process as those of Examples 1 and 2.

(1) welding current: 170 A (2) welding voltage: 26V (3) the supply of wear-resistant particles: 110 g/min.

(4) overlay beads, the height of excess weld metal: 4 mm. No attention was paid to the waviness of the beads and to the exposure of the wear-resistant particles.

Figure 14:
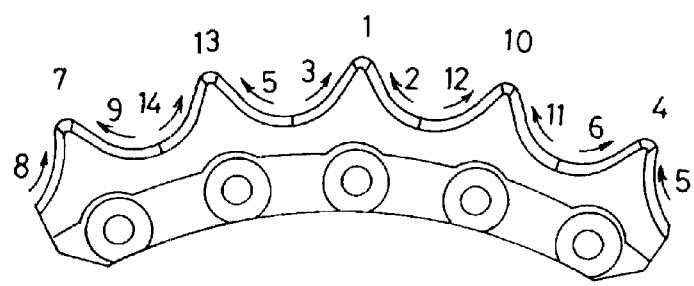
FIG. 14 shows the order of overlaying according to Comparative Example 1.

(5) overlaying order: Overlaying was successively performed on the tip and flanks of each tooth in the order indicated by numerals in FIG. 14. In each tooth flank, each bead was formed so as to extend in a direction perpendicular to the rotating direction of the sprocket teeth (see FIG. 6(b)) and the formation of such a bead was successively carried out in a direction from each tooth tip to each dedendum. In this case, the tooth top was supplied with the wear-resistant particles. At the tooth tip, temperature increased to about 380° C.

Figure 15:
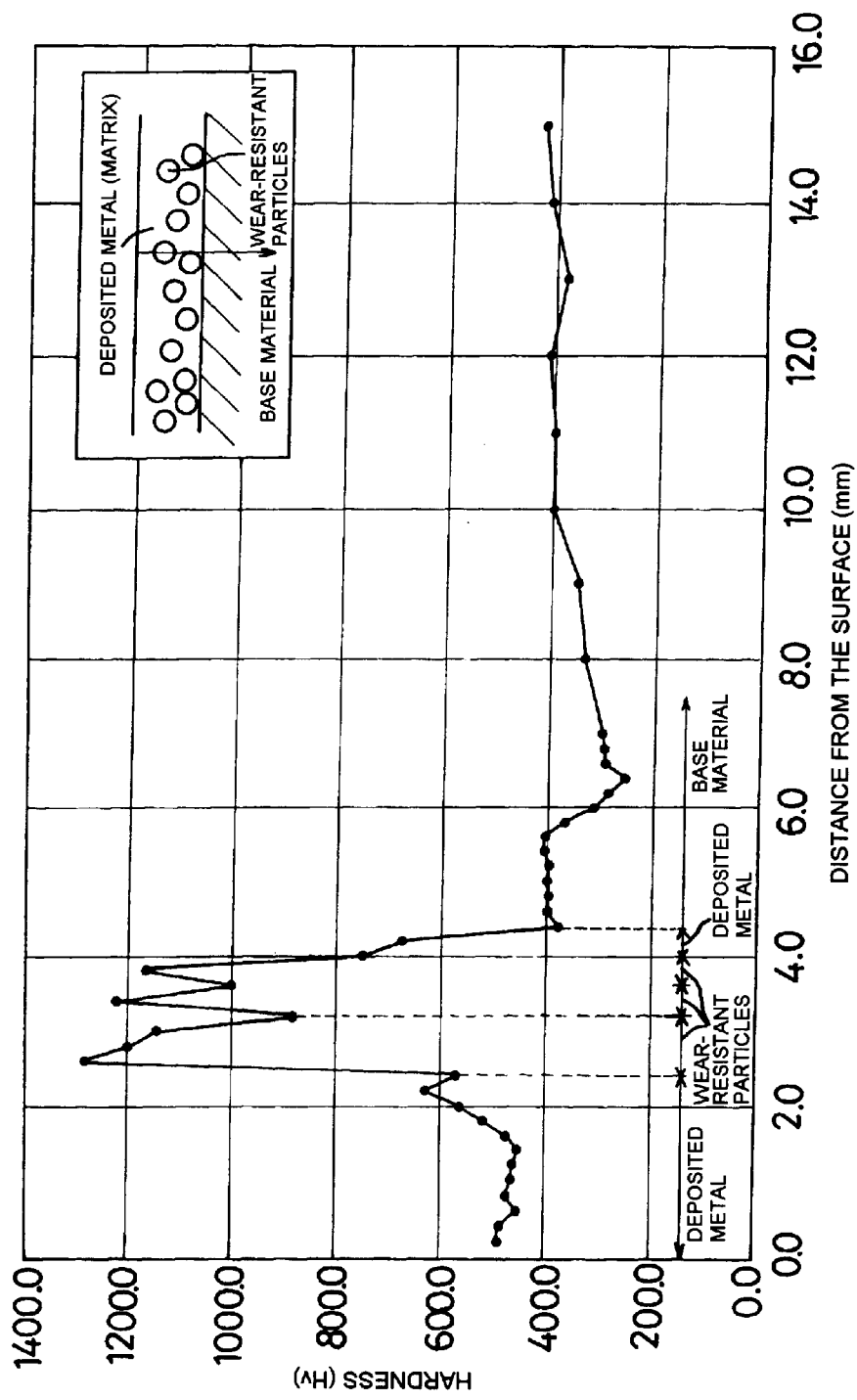
FIG. 15 is a graph showing the hardness distribution of a weld overlay according to Comparative Example 1.
Figure 16:
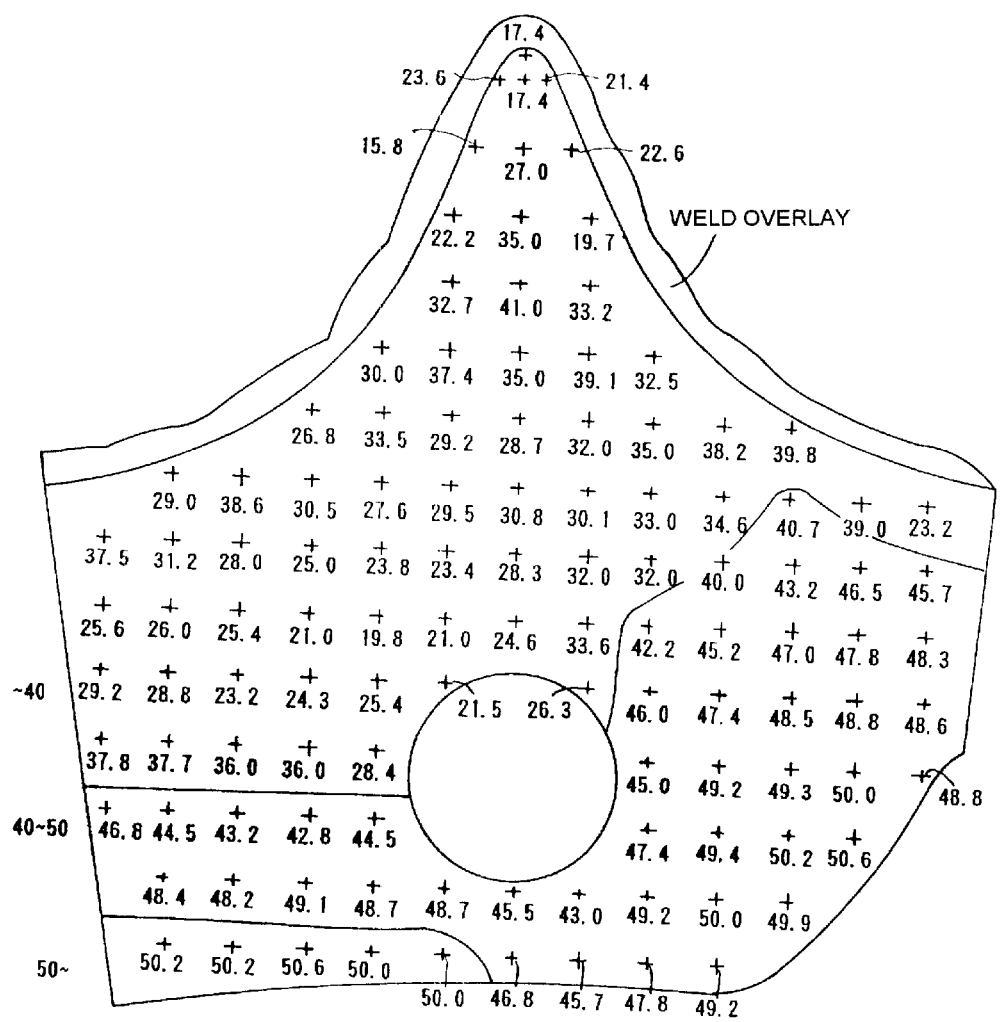
FIG. 16 is a distribution chart showing the hardness distribution of a sprocket tooth according to Comparative Example 1.
Figure 17:
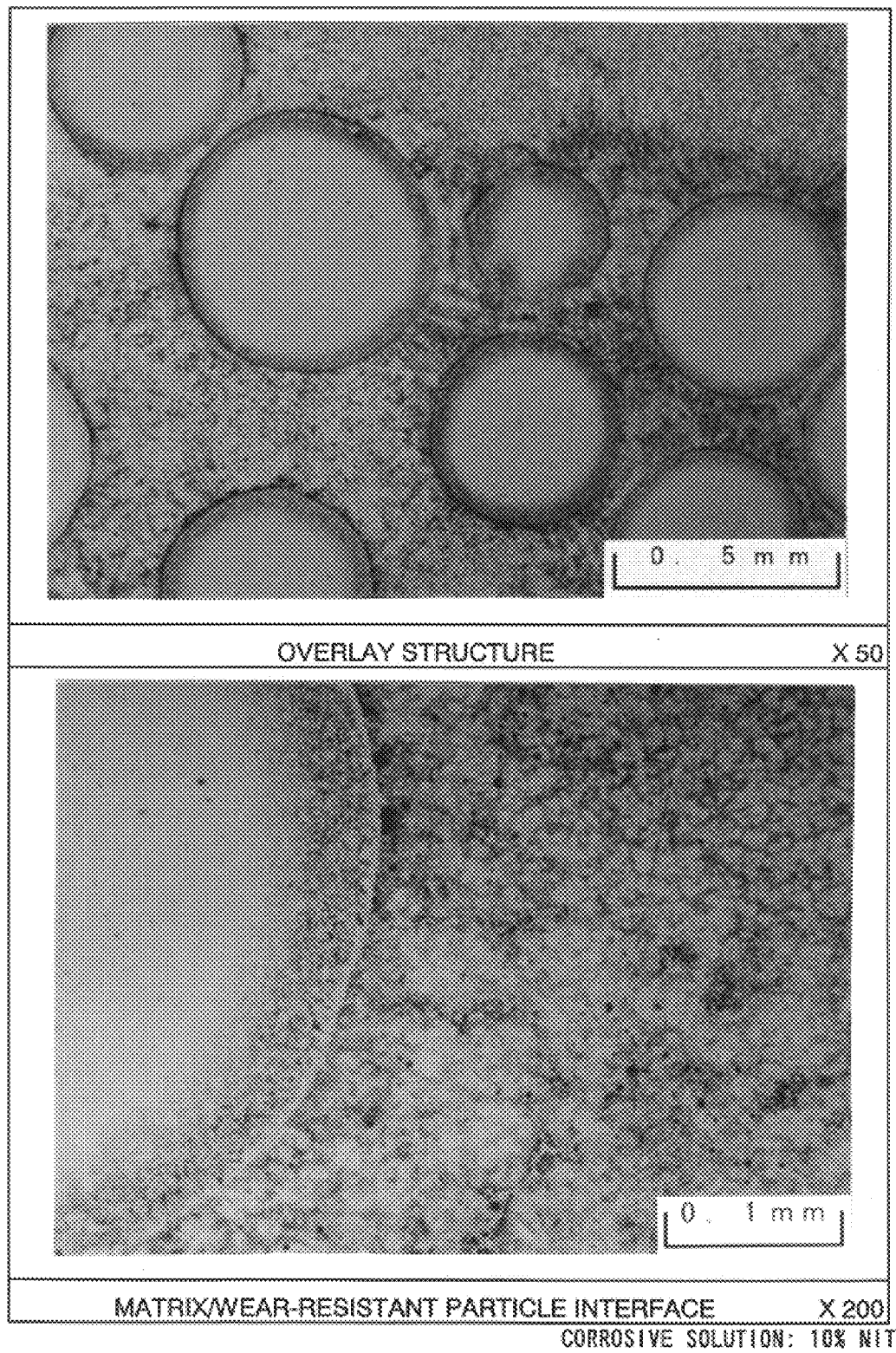
FIGS. 17(a) and 17(b) are microphotographs showing the metallographic structure of the weld overlay of Comparative Example 1.
Figure 17:
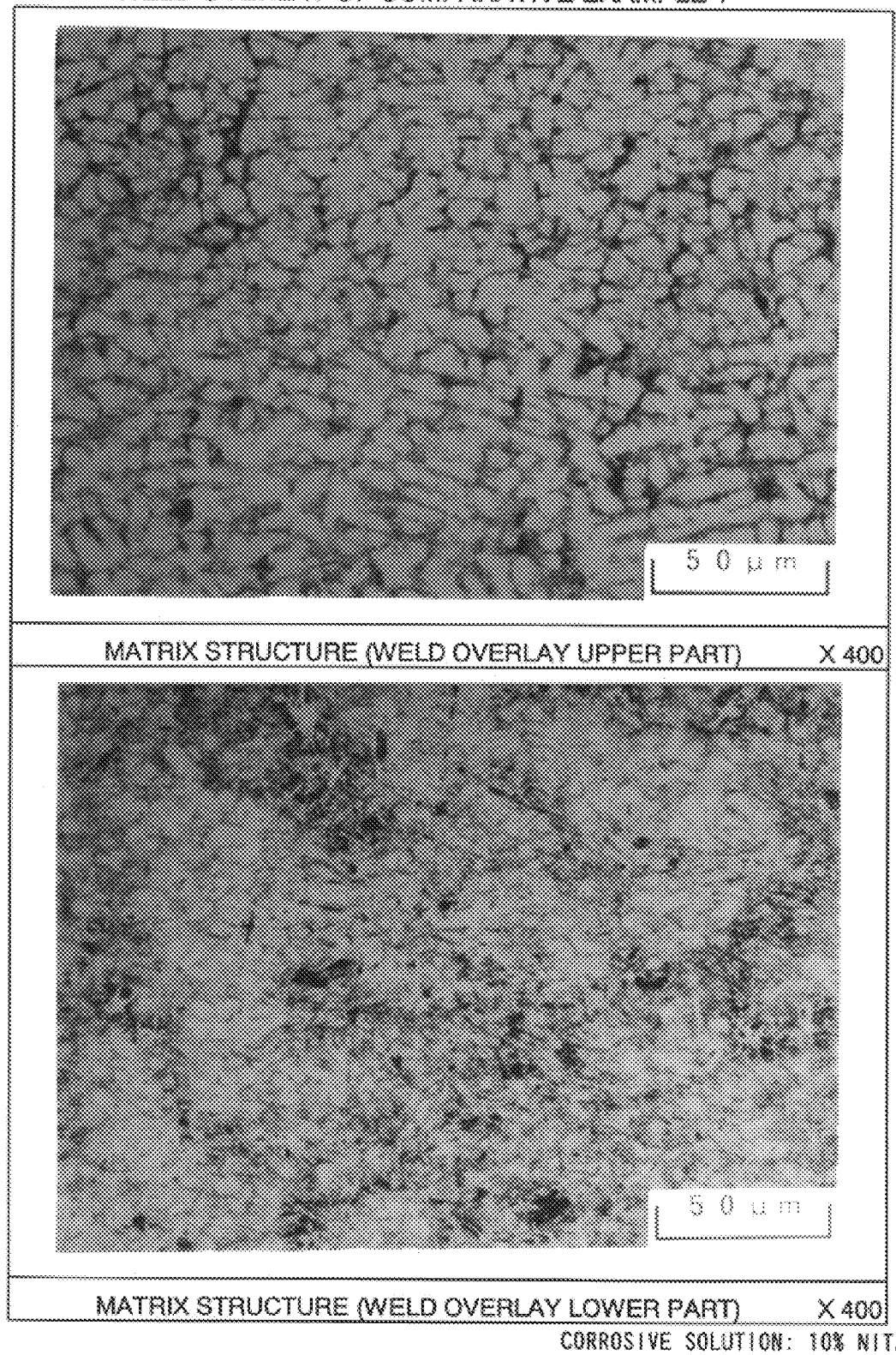

The result of a test for checking the quality of the sprocket teeth prepared in Comparative Example 1 is shown in FIGS. 15, 16 and 17. Concretely, FIGS. 15 and FIG. 16 show the hardness distribution ($H_V$ values) of the weld overlay and the cross section hardness distribution ($H_{RC}$ values), respectively. FIGS. 17(*a*) and 17(*b*) show microphotographs of the metallographic structure of the weld overlay. It was found that a number of small cracks were created in the weld overlay and these cracks terminated at the interface between the weld overlay and the base material. It is understood from these figures that the hardness of the base material at the tooth tip considerably decreased and therefore it was apprehended that wear at an early stage would occur after the weld overlay had been worn out. The hardness ($H_V$ value) of the matrix of the weld overlay was as low as about 450. The matrix of the weld overlay had a structure including residual austenite, lenticular martensite and precipitated carbide, and the lower part of the matrix had higher hardness, containing precipitated carbide more than the upper part thereof.

For checking the strength of the sprocket teeth to which thermal treatments and overlaying had been applied, the same repetitive drop weight test as conducted in Examples 1 was conducted. The test result is as follows. The tooth tip was broken and the weld overlay on the tooth tip exfoliated after applying the load for 5,000 time. Cracks, from which the exfoliation occurred, were found to have started from the recesses (bead overlapping portions) of the overlay surface.

It is understood from the results of the tests on Examples 1, 2 and Comparative Example 1 that the samples of Examples 1 and 2 were found to be satisfactory in terms of tooth tip damage, overlay exfoliation and the like. In terms of base material hardness, the samples of Examples 1 and 2 could not obtain the desired value of $H_{RC}$ 30 in the area near the tooth tip, but obtained satisfactorily high hardness compared to Comparative Example 1. On the other hand, the sample of Comparative Example 1 had considerably low hardness in the area near the to the tip and therefore it was apprehended that wear might occur at an early stage. In addition, the bead surface of Comparative Example 1 was irregular with wear-resistant particles being exposed, so that there was a good chance that cracking would occur at the recess portions owing to stress concentration and the protruding particles would scrape the mating member (bushing) off.

In Examples 1 and 2, as a means for keeping interpass temperature constant as much as possible, such an arrangement was made that overlay beads were successively aligned in a direction from each tooth tip to each dedendum. The direction of the bead alignment of the invention is not limited to this but may be a direction from each dedendum to each tooth tip so long as overlaying is carried out taking enough time and making temperature measurement at the same time.

While the invention has been applied to sprocket teeth of the segment type in Examples 1 and 2, it is equally applicable to various sprocket teeth of other types.

(2) Hard Facing Method for a Bushing

As shown in FIG. 4 described above, a weld overlay 13' is so formed as to circumferentially extend over a substantially half of the outer peripheral surface of the base material 9 of the bushing 3. In the formation of the weld overlay 13', a molten weld pool is formed on the base material 9' by an arc, while wear-resistant particles being supplied to the molten weld pool as shown in FIG. 2 so that the weld overlay 13' containing the wear-resistant particles is formed on the base material 9'. The overlaying process and thermal treatments are used in combination thereby to reinforce the weld overlay 13' and the base material 9'. This hard facing process was evaluated by adapting the following three processes after lathe turning (L-processing) of the base material 9'.

EXAMPLE 3

[Process 1] overlaying→gas carburization→quenching tempering→finishing

SCM415 having good weldability was used as the base material. For the purpose of preventing weld overlay cracking, preheating was carried out at 350° C., and arc overlaying was carried out without underlaying while the wear-resistant particles being supplied to the molten weld pool. Then, a post heating treatment was applied at 350° C. for 2 hours, and the surface was hardened through the process of gas carburization→quenching→tempering. Subsequently, grinding of the outer peripheral press fit portion, and grinning and burnishing of the end faces were carried out thereby obtaining a finished product. Carburization temperature was 950° C., hardened depth was 4 mm, reheating hardening temperature was 850° C., the temperature of water used in quenching was 30° C., and tempering was carried out at 220° C. for 3 hours.

EXAMPLE 4

Comparative Examples 2 to 5

[Process 2] overlaying→oil hardening→tempering→inner peripheral surface induction hardening→tempering→finishing SAE4161A was used as the base material in view of hardenability. Preheating was carried out at 350° C., and after overlaying in a similar way to Process 1, a post heating treatment was carried out at 350° C. for 2 hours. Then, oil hardening (quenching temperature=830° C., the temperature of quenching oil=150° C. (Example 4 and Comparative Examples 3 to 5) or 40 to 80° C. (Comparative Example 2)); tempering (at 180° C. for 1 hour); inner peripheral surface induction hardening; and tempering (at 200° C. for 3 hours) were sequentially carried out to harden the surface. Thereafter, grinding of the outer peripheral press fit portion, and grinding and burnishing of the end faces were carried out thereby obtaining a finished product. It should be noted that the purpose of inner peripheral surface induction hardening is forming a temper-softened region at a core to improve impact fatigue strength and it was carried out by induction-heating the inner peripheral surface while the outer peripheral surface being cooled. In order to prevent cracks created in the weld overlay from extending to the base material after welding or during quenching, underlaying by use of mild steel was considered. Where underlaying was carried out, an underlay of mild steel was applied to a half of the circumference of the bushing in Comparative Examples 2 to 4, and was applied to the entire circumference of the bushing in Comparative Example 5.

Comparative Examples 6 to 8

[Process 3] oil hardening→tempering→overlaying→inner peripheral surface induction hardening→tempering→finishing SAE4161A was used as the base material for the same reason as that of Process 2. Prior to overlaying, oil hardening and tempering were sequentially carried out to harden the entire base material to have the desired hardness and then, overlaying was carried out. Two levels of preheating temperature was adapted in welding. Specifically, preheating temperature for Comparative Examples 6 and 8 was 350° C. and preheating temperature for Comparative Example 7 was 250° C. Underlaying was not carried out in Comparative Examples 6 and 7, while an underlay of mild steel was applied to a half of the circumference of the bushing in Comparative Example 8.

In each of Processes, overlaying was performed by forming straight beads having a width of 15 mm in an overlapping manner. By forming narrow overlay beads so as to overlap, the structure of a weld overlay could be formed uniformly. If wide beads are laid, the molten weld pool to which the particles are to be supplied will be large and the distribution of the wear-resistant particles in the molten weld pool is likely to be unstable, resulting in non-uniform particle distribution in the weld overlay. Further, solidification shrinkage of the beads is more likely to occur, which increases the possibility of cracking in the weld overlay. On the other hand, in cases where thin beads are laid so as to be partially overlapped, the particle distribution of each bead is very stable; the distribution of wear-resistant particles is uniform over the entire area of the weld overlay; less shrinkage occurs; and cracking is less likely to occur.

Since the height of excess weld metal tends to increase when starting arcing, fine control of welding rate was performed thereby making the excess weld metal uniform. At the end of arcing, wear-resistant particles are sometimes excessively supplied, resulting in defects, or the supply of wear-resistant particles is sometimes insufficient so that the weld overlay becomes short of excess weld metal. To avoid such unfavorable situations, optimum timing was set for cutting off of a supply of wear-resistant particles. In addition, since workpiece temperature gradually increases with the molten weld pool becoming larger in continuous welding, the particle content of the weld overlay increases, resulting in increases in the height of excess weld metal. Taking this into account, the welding rate was adjusted for every pass so as to make the particle content and excess weld metal of the weld overlay uniform.

Herein, the diameter of the wear-resistant particles to be added preferably ranges from, for instance, 0.1 mm to 1 mm for the reason that smaller particles can penetrate into the gaps between larger particles thereby enabling densely charging the matrix o the weld overlay with the particles.

The test results of Examples 3, 4 and Comparative Examples 2 to 8 will be de described below.

Test Result—Example 3

Figure 18:
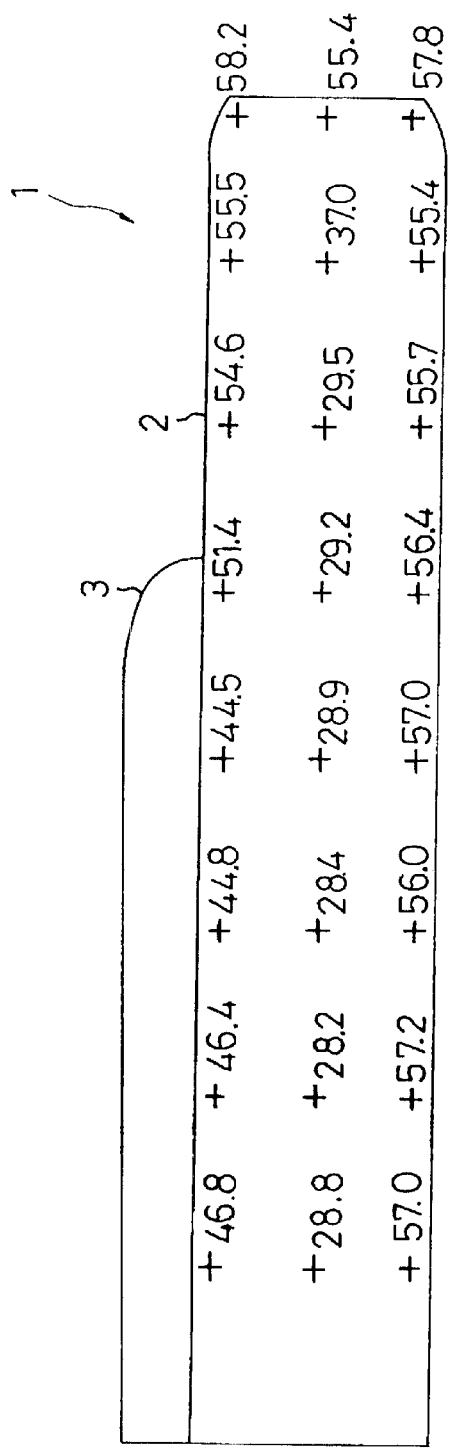
FIG. 18 is a distribution chart showing the cross section hardness distribution of a base material according to Example 3.
Figure 19:
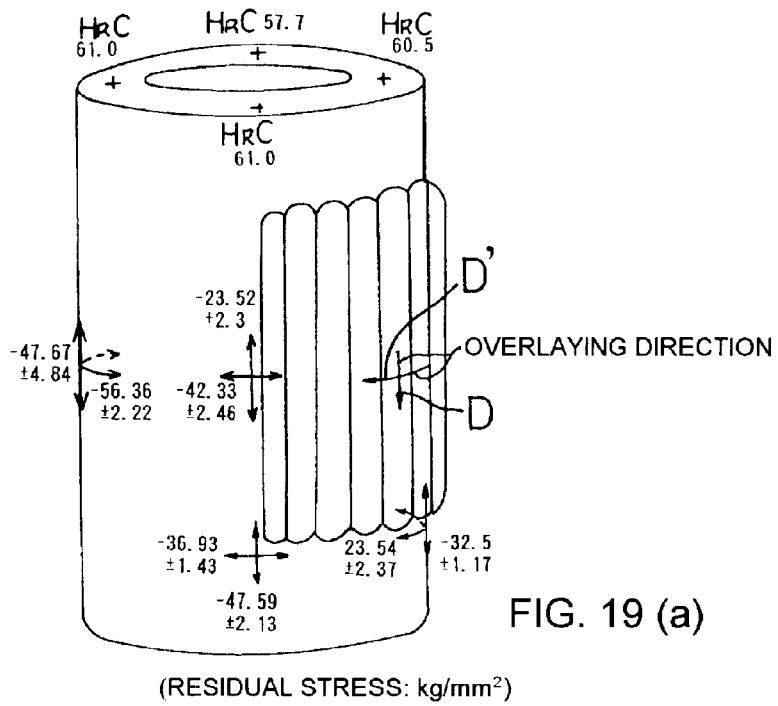
FIGS. 19(a) and 19(b) are diagrams showing the hardness of an end face of the base material, residual stresses on the outer peripheral surface of the base material and the position of a crack on a weld overlay according to Example 3.
Figure 19:
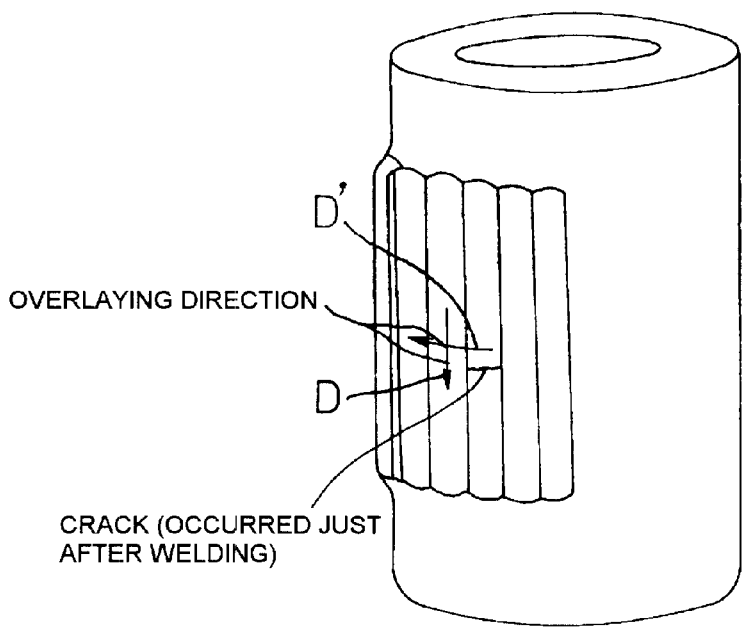
Figure 20:
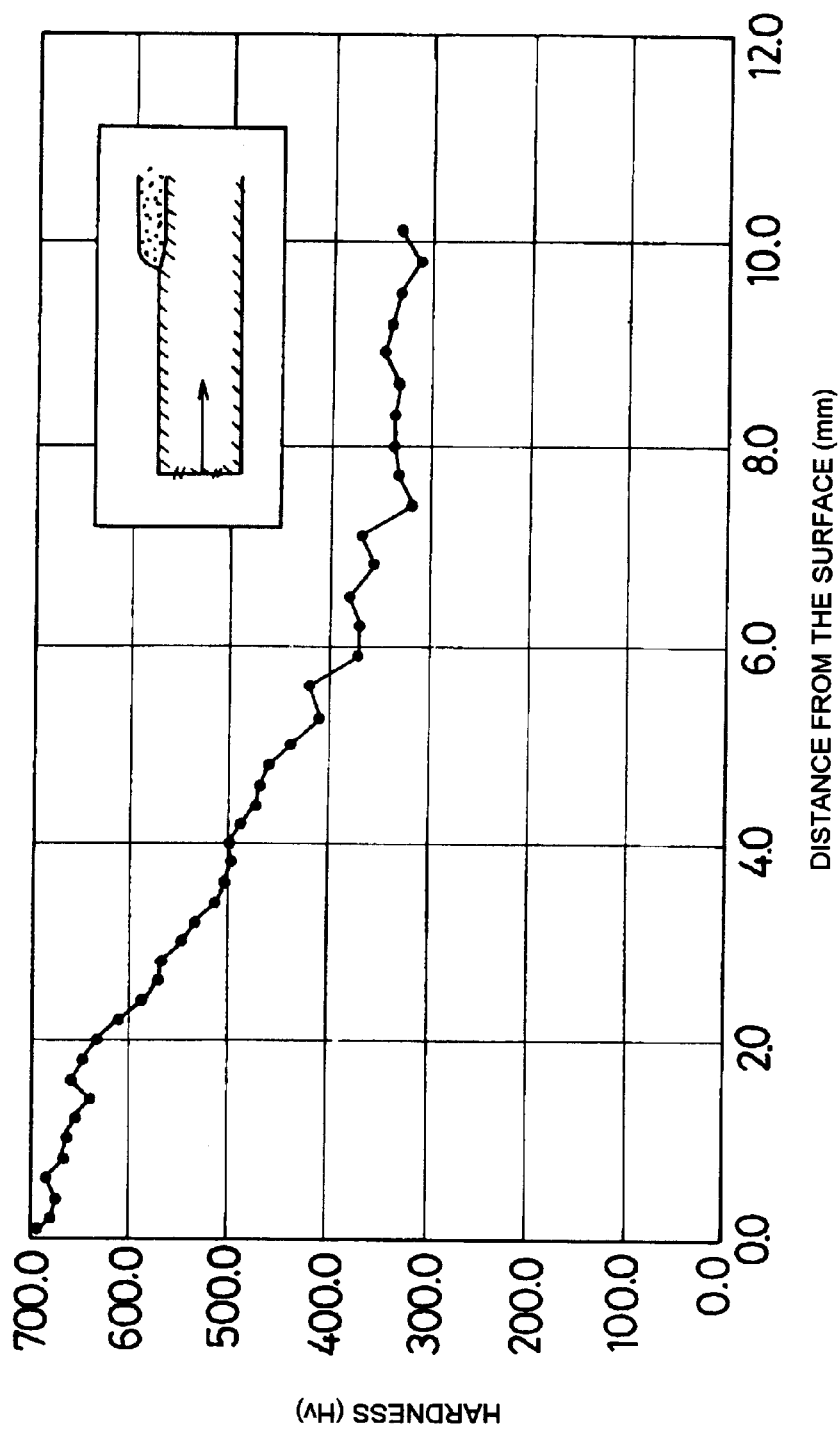
FIG. 20 is a graph showing the hardness distribution of a carburized layer (at an end face) according to Example 3.
Figure 21:
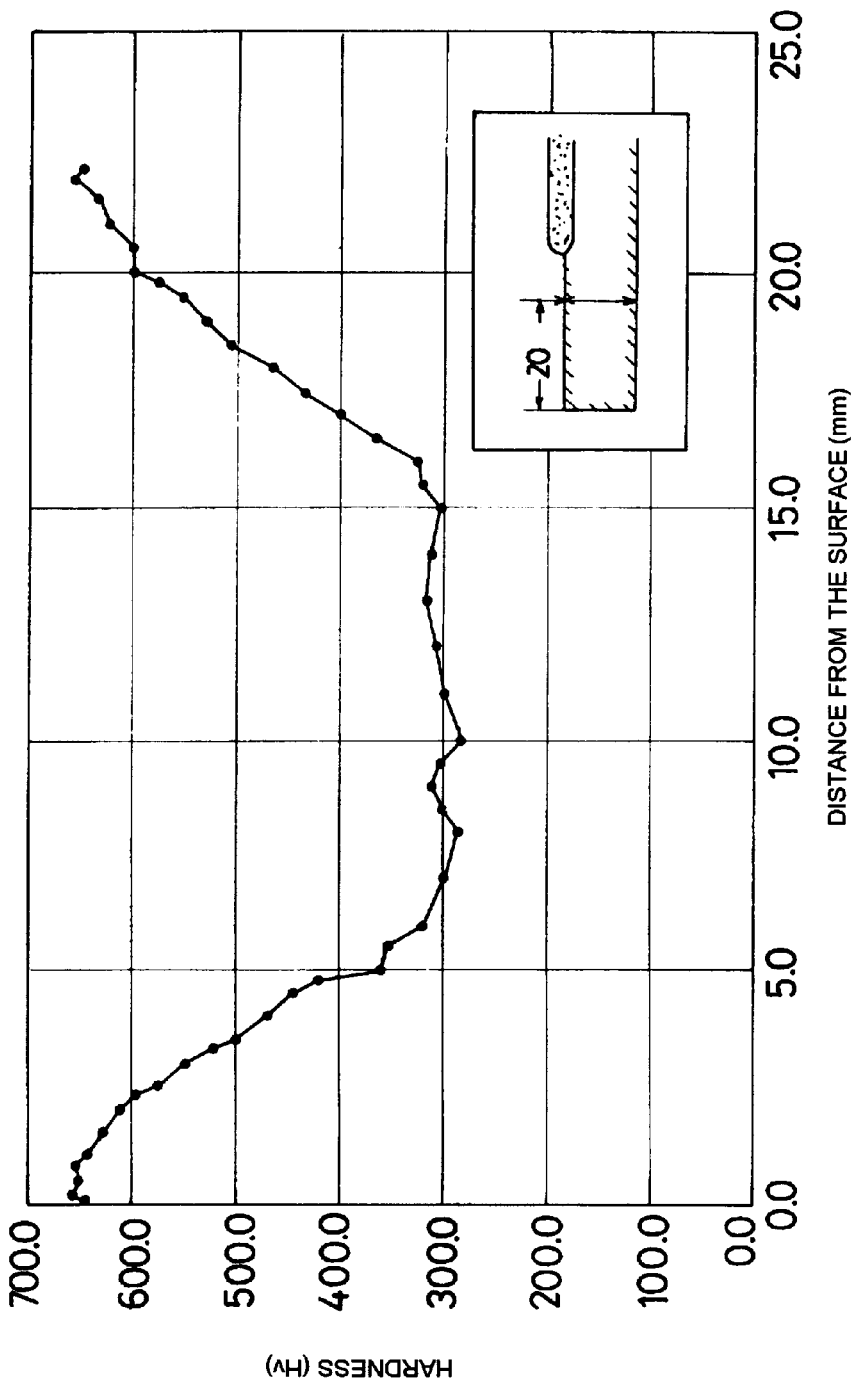
FIG. 21 is a graph showing the hardness distribution of a carburized layer (in the area extending from the inner peripheral surface to the outer peripheral surface) according to Example 3.
Figure 22:
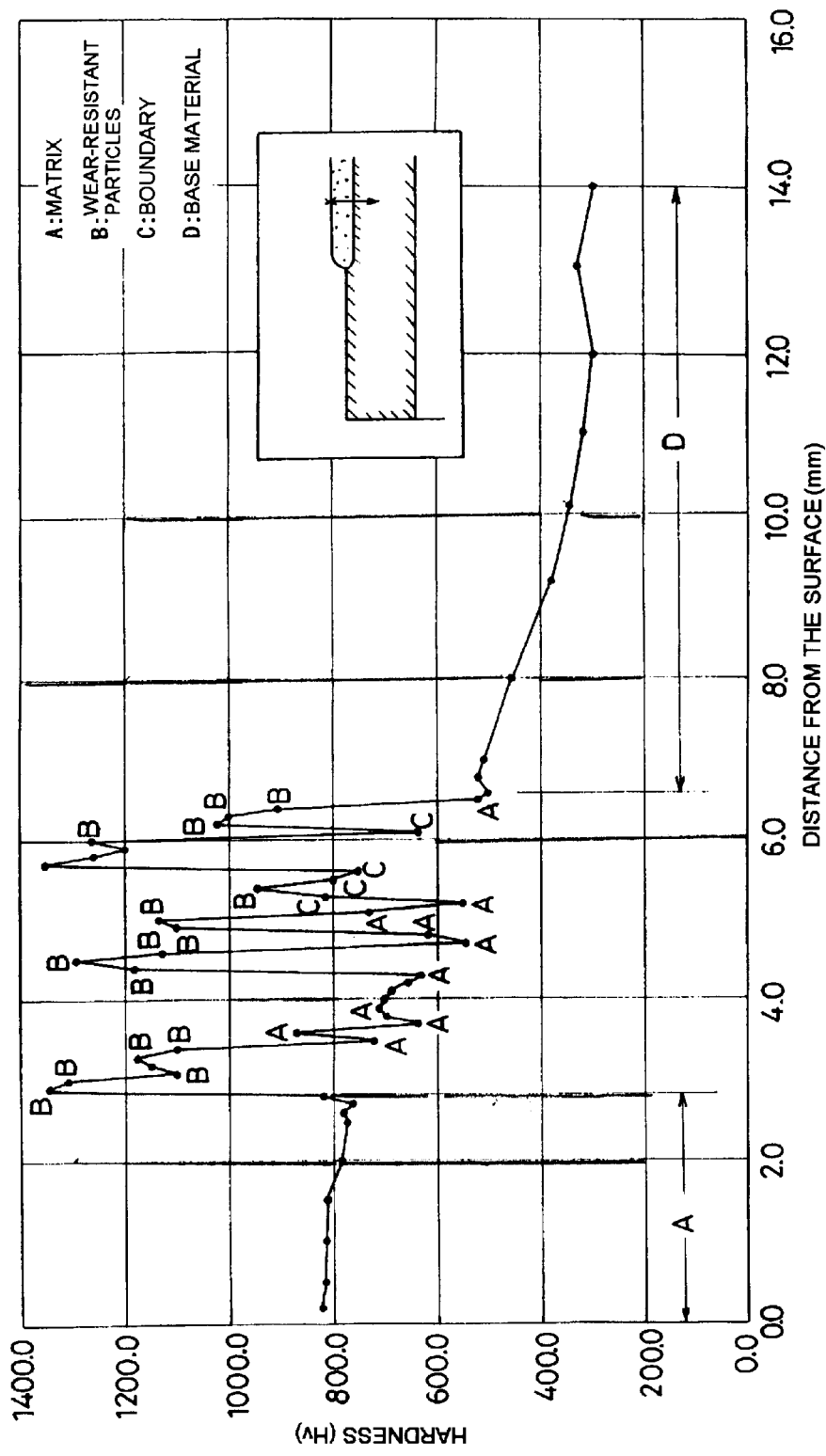
FIG. 22 is a graph showing the hardness distribution of a weld overlay according to Example 3.
Figure 23:
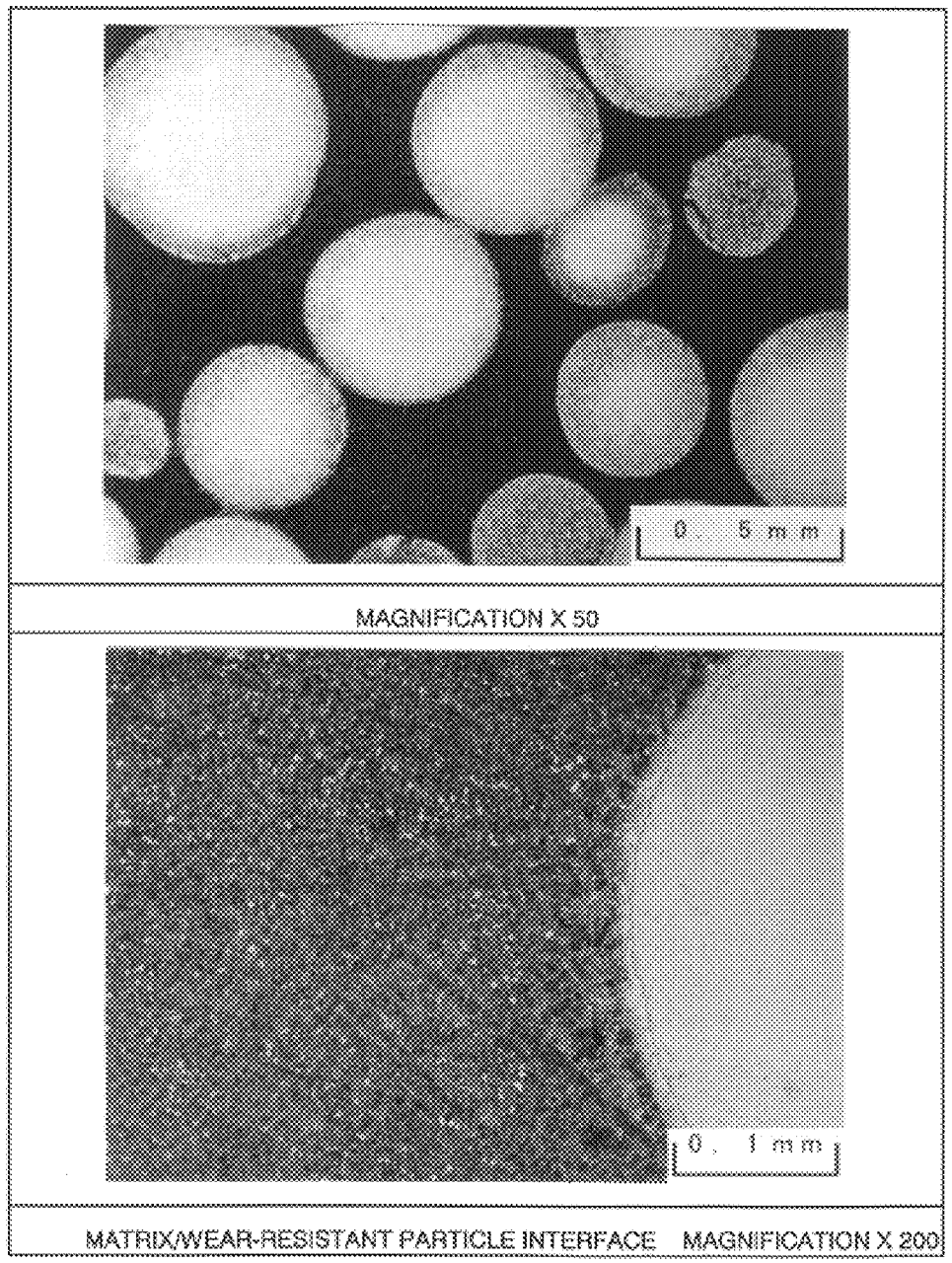
FIGS. 23(a) and 23(b) are microphotographs showing the metallographic structure of the weld overlay of Example 3.
Figure 23:
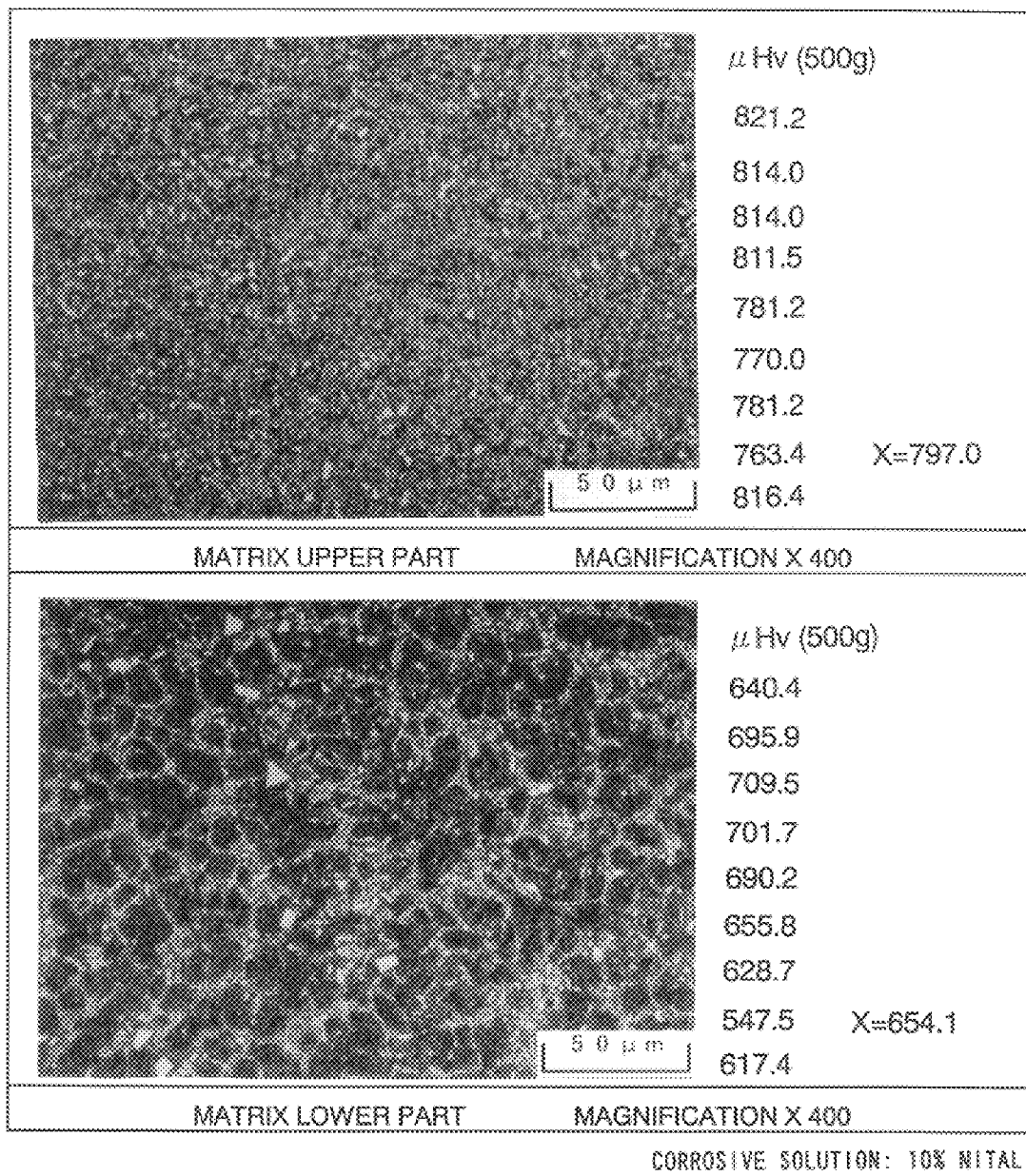

FIG. 18 demonstrates the cross section hardness distribution ($H_{RC}$ values) of the base material, whereas FIG. 19(a) demonstrates the hardness ($H_{RC}$ values) of the end face of the base material and the values of residual stresses on the outer peripheral surface if the base material. Note that the sign—in FIG. 19(a) indicates compressive stress. FIG. 19(b) shows the position of a crack which occurred in the weld overlay. FIGS. 20, 21 and 22 show the hardness distribution ($H_V$ values) of the end face of the base material, the hardness distribution ($H_V$ values) of the area extending from the inner peripheral surface to the outer peripheral surface of the base material and the hardness distribution ($H_V$ values) of the weld overlay, respectively. FIGS. 23(a) and 23(b) show microphotographs of the metallographic structure of the weld overlay (Note that the figures in FIG. 23(b) indicate hardness ($H_V$) and average hardness (X) at arbitrary nine points under a load of 500 g). The average hardness of the end face of the base material was $H_{RC}$ 60.1. The residual stress of the weld overlay could not be measured because the surface of the weld overlay was not uniform.

In the quenching step after carburization, no cracking was found in the base material nor in the weld overlay. The surface of the base material was carburized and therefore transformation-expanded during quenching, whereas the inner part of the base material was shrunk, so that compressive residual stress was generated on the surface of the base material. The weld overlay was composed of wear-resistant particles and an alloy layer, and the coefficient of linear expansion of the wear-resistant particles was a substantially half of that of steel. Therefore, the amount of shrinkage of the weld overlay containing the wear-resistant particles during quenching was less than that of the base material, so that compressive residual stress occurred in the weld overlay. The transformation expansion of the surface of the base material was restrained so that compressive residual stress also occurred in a region of the base material close to the toe of the weld overlay. These residual stresses contributed to prevention of cracking during quenching and to improvements in fatigue strength.

It is understood from the above measurement result that the end face hardness and inner peripheral surface hardness of the base material 9 satisfy the required value ($H_{RC}$ 54 or more) and the outer peripheral surface hardness also satisfies the required value ($H_{RC}$ 5 or more). The depth of the hardened region (having a hardness of $H_{RC}$ 10 or more) is a satisfactory value, that is, 3 mm or more. No cracks were found in the base material. Although minute cracks (see FIG. 19(b)) were created in the weld overlay just after welding, these cracks terminated at the interface between the overlay and the base material and it was confirmed by a repetitive drop weight test that the cracks did not develop into exfoliation nor extend to the base material.

As seen from the microphotographs of FIG. 23(b), in the upper part of the matrix of the weld overlay, carbide produced from carbon which had penetrated from outside during carburization and eutectic carbide precipitating due to the presence of tungsten and carbon which had melted out of the wear-resistant particles were sphered by long-time heating in a diffusion process in carburization, and uniformly, finely dispersed over the entire matrix (these spherical substances appeal; in white in the photograph). In the lower part of the matrix, wear resistance was enhanced by the wear-resistant particles per se, and tungsten and carbon which had melted out of the wear-resistant particles caused precipitation of eutectic carbide. Similarly to the eutectic carbide in the upper part of the matrix, this eutectic carbide was sphered and fined down by long-time heating in carburization. Further, the substrates of these structures were allowed to become fine martensite (which appears in black in the photograph) so that hardness was further improved and a structure of higher wear resistance was obtained.

Test Result Example 4

FIG. 24 shows the cross section hardness distribution ($H_{RC}$ Values) of the base material while FIGS. 21(a) to 25(d) show cracking conditions and the values of residual stresses imposed on the outer peripheral surface of the base material, after oil hardening and tempering. The average of the end face hardness of the base material was $H_{RC}$ 59.0. Cracks were not found in the base material but minute cracks (vertical cracks) were found to be present on the weld overlay, running in the welding direction. Checking the depth of each crack at the cross section which transverses the crack, it was found that each crack terminated at the surface layer of the weld overlay. Cracks (lateral cracks) which had been an created during welding did not extend toward the base material. On the entire outer peripheral surface, tensile residual stresses occurred. It should be noted that although the sample of this example underwent inner peripheral surface induction hardening and tempering after that, no further investigation was made for this example.

Test Result—Comparative Example 2

Figure 26:
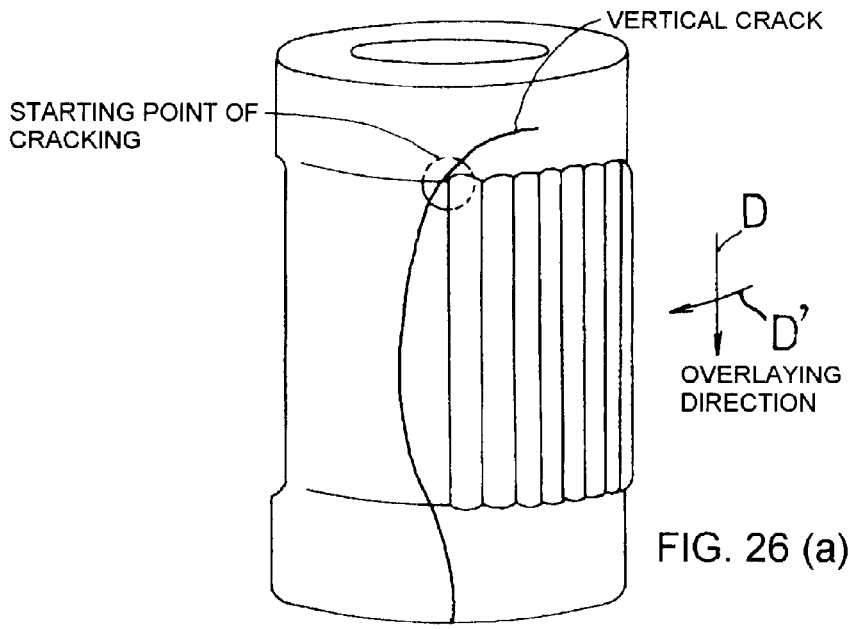
FIGS. 26(a) and 26(b) each show cracking condition before oil hardening/tempering according to Comparative Example 2.
Figure 26:
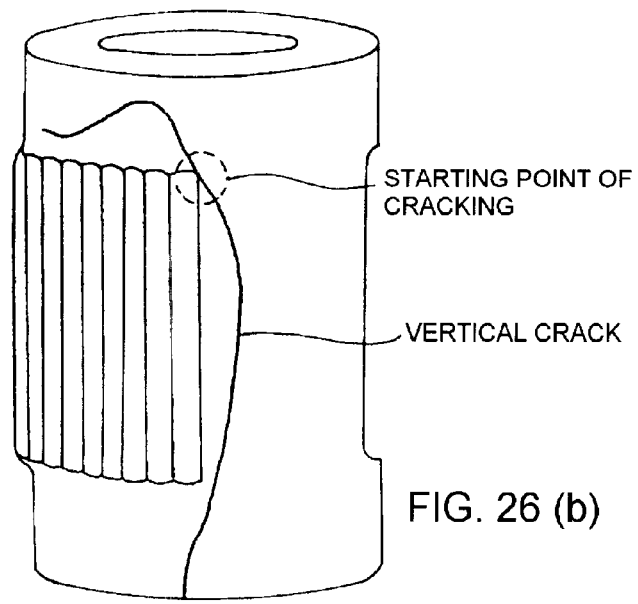
Figure 27:
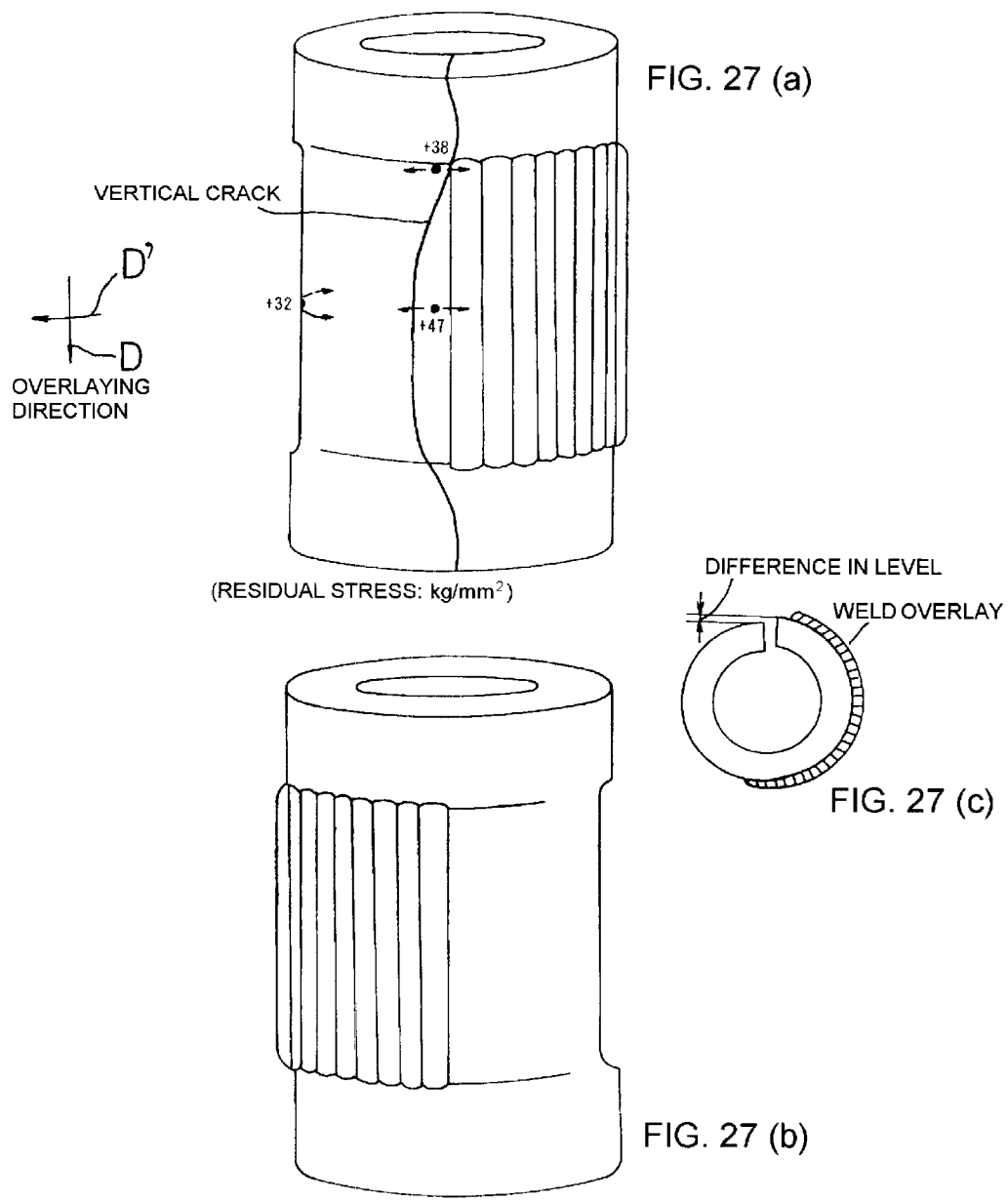
FIGS. 27(a), 27(b) and 27(c) show a cracking condition and the values of residual stresses after oil hardening/tempering according to Comparative Example 2.

FIGS. 26(a) and 26(b) show cracking conditions prior to oil hardening and tempering, while FIGS. 27(a), 27(b) and 27(c) show a cracking condition and the values of residual stresses after oil hardening and tempering. In this example, no cracking occurred in the weld overlay but the base material fractured. It was also found that a tensile stress of about 40 kg/mm$^2$ still remained in the vicinity of cracks after the occurrence of the cracks. The cracks respectively started from the corners of the weld overlay and are presumed to have occurred after tempering, taking into account the fact that the fracture was clear gray.

Test Result—Comparative Example 3

Figure 28:
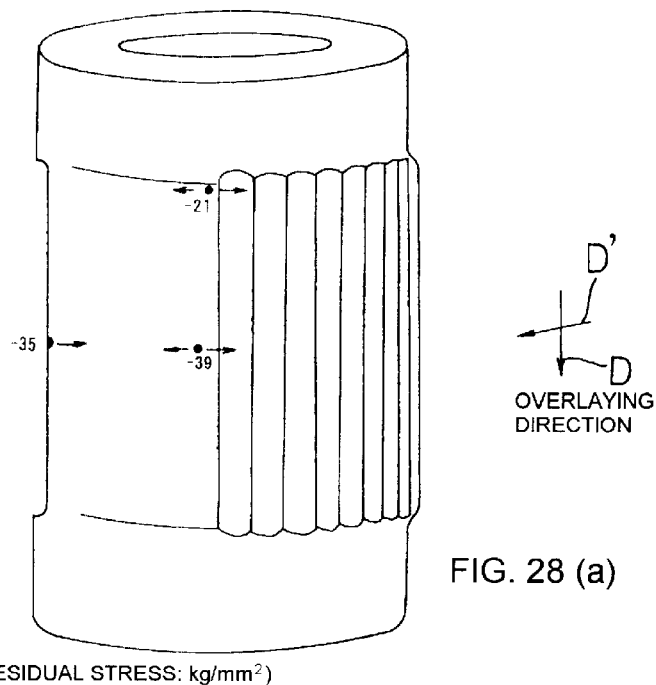
FIGS. 28(a) and 28(b) show a cracking condition and the values of residual stresses after oil hardening/tempering according to Comparative Example 3.
Figure 28:
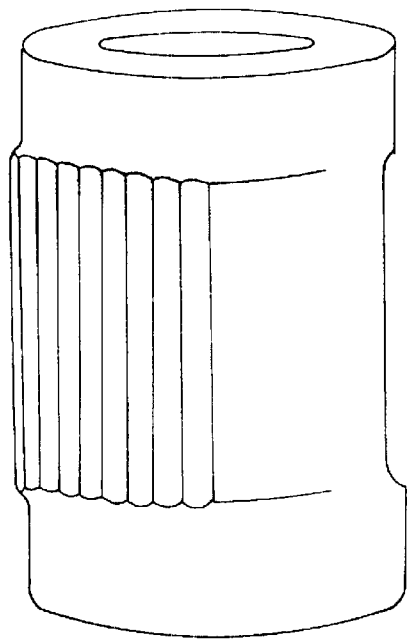

FIGS. 28(a) and 28(b) show a cracking condition and the values of residual stresses after oil hardening and tempering. In this comparative example, cracking due to oil hardening and tempering did not occur in the base material nor in the weld overlay. The cracks which had occurred in the weld overlay in welding did not extend further. Compressive stresses remained on the outer peripheral surface. End face hardness significantly varied, ranging from $H_{RC}$ 52.4 to 56.1, and some regions did not satisfy the desired hardness of $H_{RC}$ 54. In addition, the inside of the sample was not well hardened, having a hardness of $H_{RC}$ 40 to 50. Particularly, the inner peripheral side had low hardness, from which it is presumed that the flow of oil might be insufficient in the inner peripheral side.

Test Result—Comparative Example 4

Figure 29:
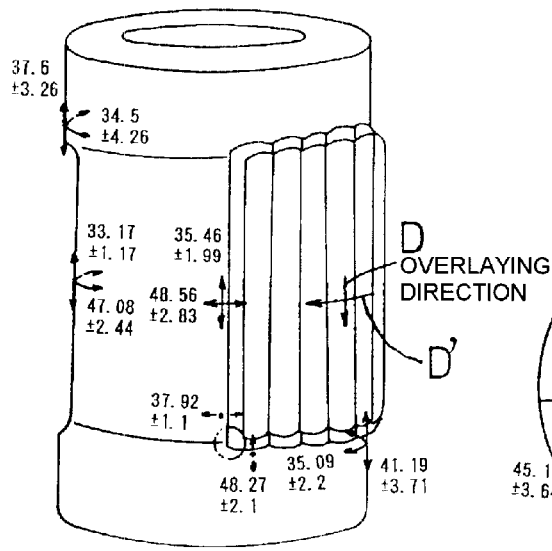
FIGS. 29(a), 29(b) and 29(c) show a cracking condition and the values of residual stresses after oil hardening/tempering according to Comparative Example 4.
Figure 29:
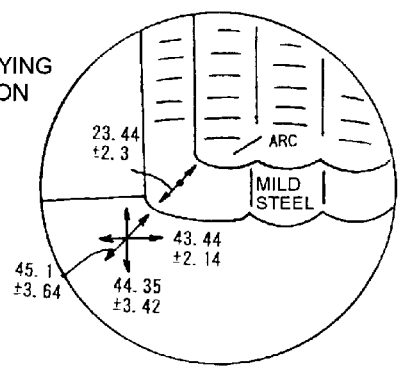
Figure 29:
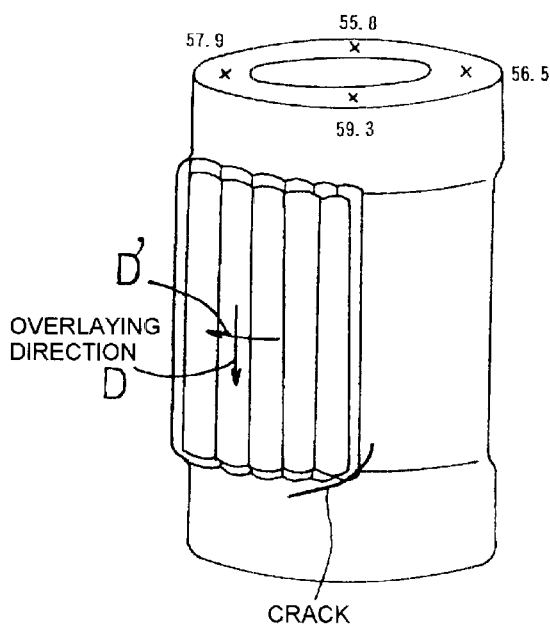

In this example, a test was conducted with lower oil temperature in order to increase hardness, since the sample of Comparative Example 3 exhibited low end face hardness. It was assumed from various data that oil temperature which was able to provide a target value of $H_{RC}$ 54 or more was 120° C. A cracking condition and the values of residual stress after oil hardening and tempering in Comparative Example 4 are shown in FIGS. 29(a), 29(b) and 29(c). This test was conducted five times and it was found that tensile stresses remained on the outer peripheral surface and cracking occurred in the base materials of all of the five samples, starting from the corners of the weld overlays. No cracking due to the thermal treatments newly occurred in the weld overlays of the samples. The end face hardnesses of the samples were $H_{RC}$ 54 or more.

Test Result—Comparative Example 5

Figure 30:
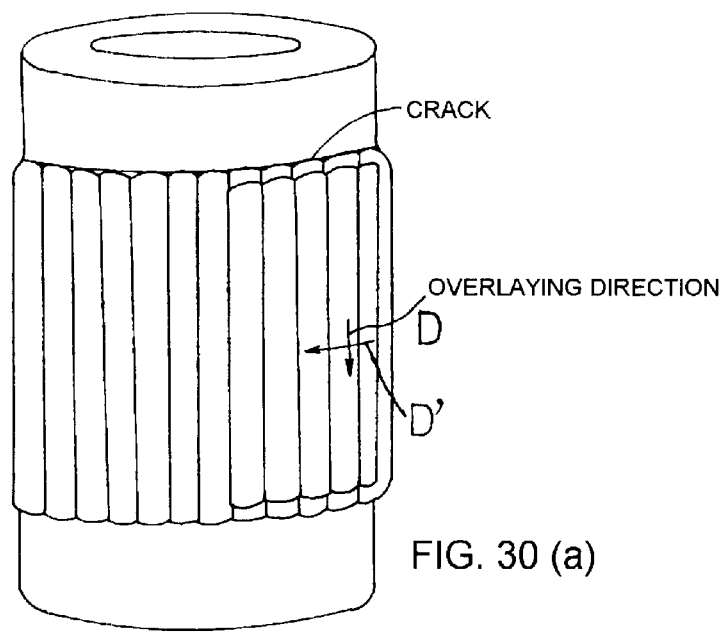
FIGS. 30(a) and 30(b) show cracking conditions after oil hardening/tempering according to Comparative Example 5.
Figure 30:
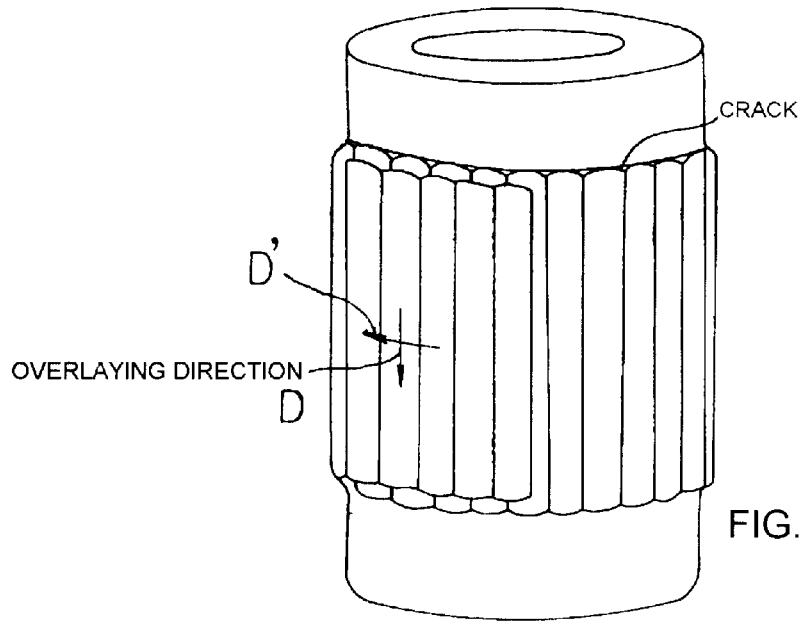

Since the starting points of cracks were the corners of the weld overlay and the residual stresses on the corner were high in Comparative Example 4, the sample of this comparative example was arranged such that an underlay of mild steel was applied to the entire circumference of the sample to remove the corners of the weld overlay. Further, taking into consideration the fact that the shape of the toe is the cause of quench cracking, there were also prepared samples which had been cut and smoothly finished. FIGS. 30(a) and 30(b) show cracking conditions after oil hardening and tempering. As seen from these figures, cracking occurred in the base material at an edge of the mild steel underlay. Similar cracking occurred in the toe which had been made to be smooth by finishing and therefore no effects of finishing were admitted. No cracking newly occurred in the weld overlay.

It is understood from the cross section hardness distribution of the base material that there was a difference in cooling rate between the outer peripheral side and the inner peripheral side. The outer peripheral side was more rapidly cooled and therefore hardened first, and then the inner peripheral side was hardened. This caused tensile residual stress on the outer peripheral side. Since the underlay of mild steel was not hardened and transformation-expanded, the amount of shrinkage of the underlay was greater than that of the base material and there occurred a tensile residual stress on the base material in the vicinity of the toe of the underlay. These two residual stresses were the cause of cracking.

Test Example—Comparative Examples 6 and 8

Figure 31:
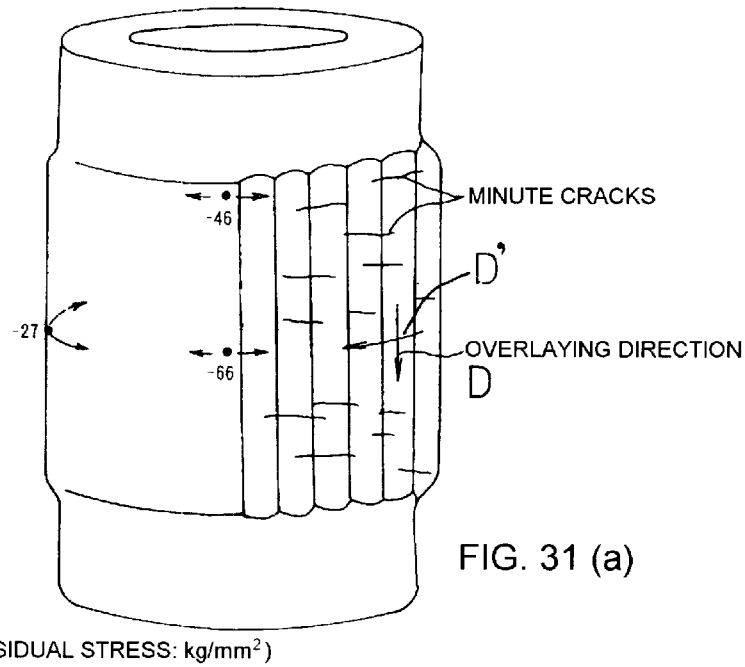
FIGS. 31(a) and 31(b) show a cracking condition, the hardness of an end face, and the values of residual stresses after inner peripheral surface induction hardening/tempering, according to Comparative Example 6.
Figure 31:
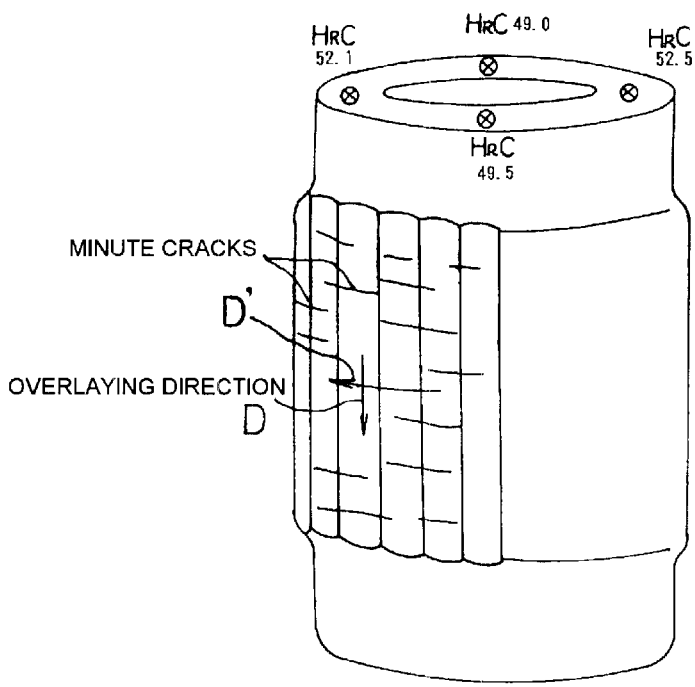
Figure 32:
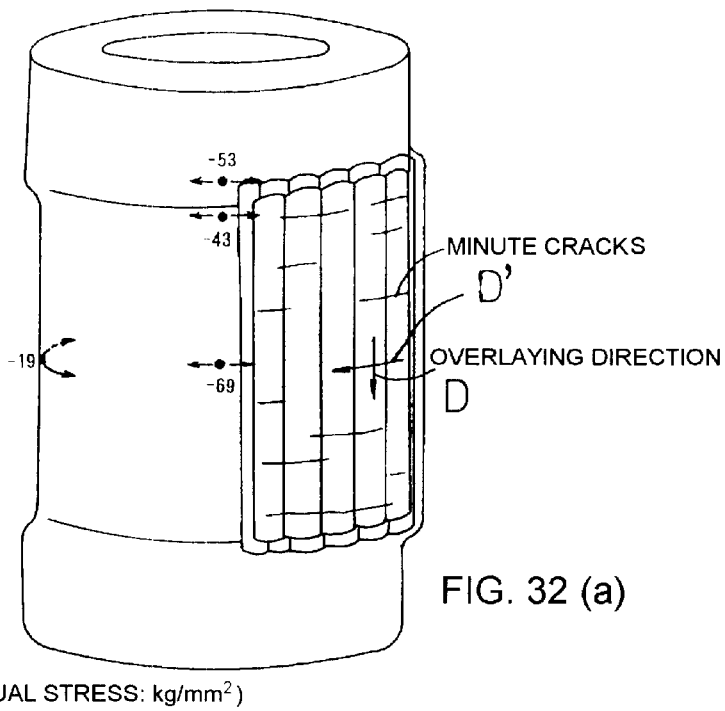
FIGS. 32(a) and 32(b) show a crack condition, the hardness of an end face, and the values of residual stresses after inner peripheral surface induction hardening/tempering, according to Comparative Example 8.
Figure 32:
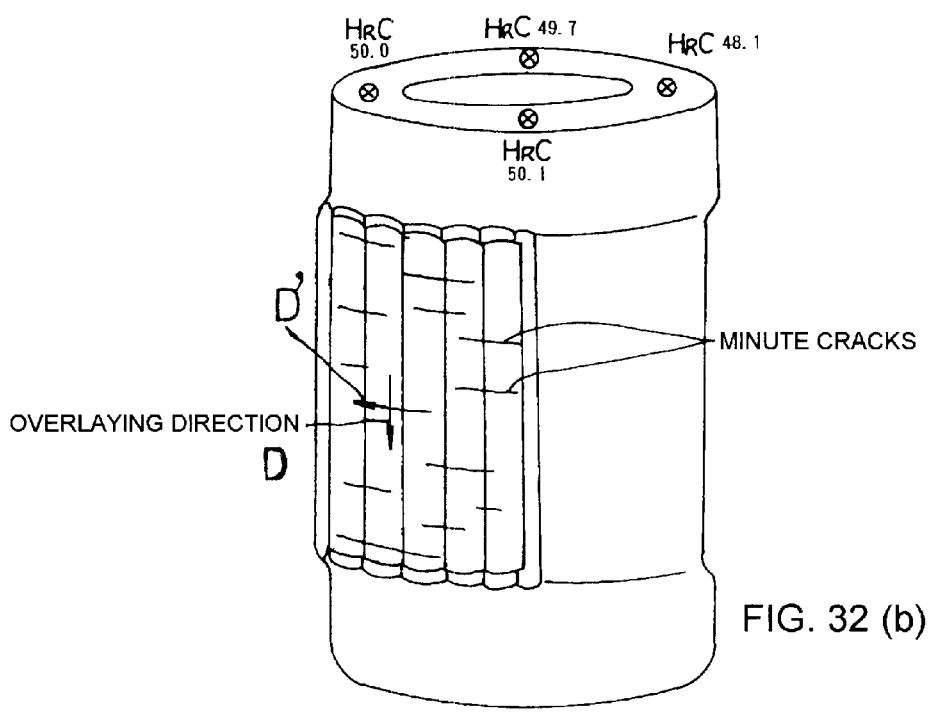

Comparative Example 6 is a case where no underlay is applied whereas Comparative Example 8 is a case where an underlay is applied. FIGS. 31(a) and 31(b) show a cracking condition, end face hardness, and the values of residual stresses after the process of inner peripheral surface induction hardening tempering in Comparative Example 6. FIGS. 32(a) and 32(b) show a cracking condition, end face hardness, and the values of residual stresses after the process of inner peripheral surface induction hardening tempering. Regardless of the presence/absence of a mild steel underlay, no cracking occurred in the base material, but a number of extremely fine cracks were created in a direction substantially perpendicular to the direction of welding within the weld overlay containing the wear-resistant particles dispersed therein. Checking the depths of the respective cracks at their cross sections which transverse the cracks, it was found that these cracks terminated at the upper layer of the weld overlay where no particles are present, similarly to Example 4. In the inner peripheral surface induction hardening, the inner peripheral side was heated to $A_1$ point or more while the outer peripheral side being water cooled, so that extremely high gradients of temperature were caused. This caused thermal stress which led to cracking. Regarding residual stress, compressive stress was generated on the outer peripheral surface. The end face hardness did not reach the desired value because the samples were softened in the course of welding.

Test Result—Comparative Example 7

Figure 33:
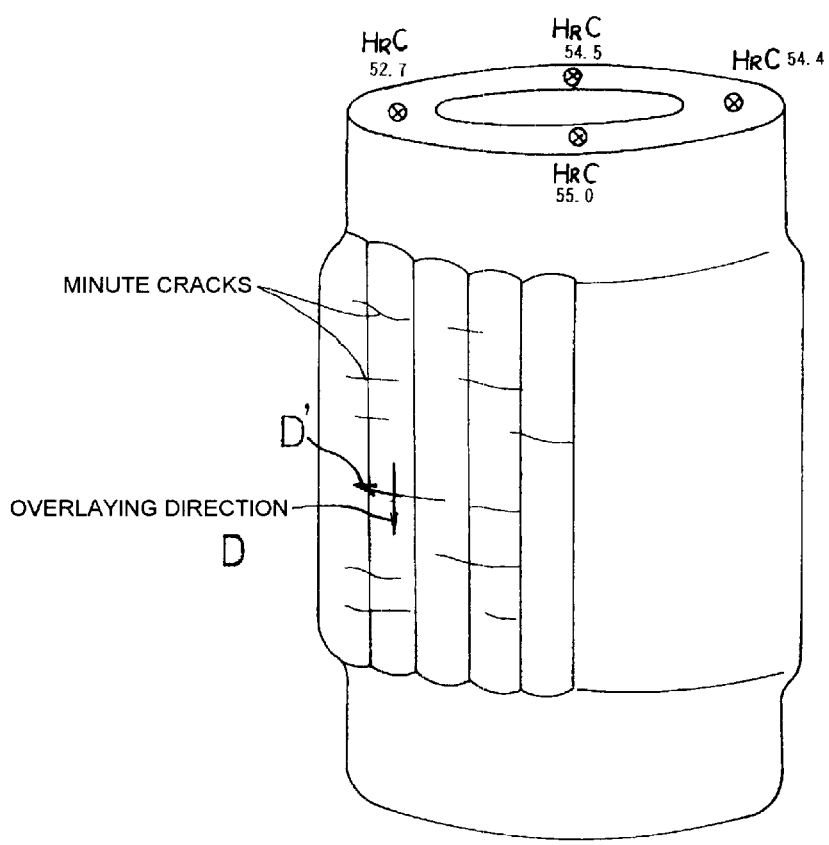
FIG. 33 shows a cracking condition and the hardness of an end face after overlaying according to Comparative Example 7.

As an improvement over Comparative Example 6, a sample of Comparative Example 7 was prepared by reducing preheating temperature and post heating temperature from 350° C. to 25° C. FIG. 33 shows a cracking condition and end face hardness after overlaying. As obvious from this result, cold cracking did not occur in the base material even though preheating temperature and post healing temperature had been decreased to 250° C. and no difference was admitted between the Comparative Examples 6 and 7 in terms of the manner of cracking in the overlay. The end face hardness of this example was higher than that of Comparative Example 5 by 0.6 to 5 points but did not meet the desired value $H_{RC}$ 54. The reason why the end face hardness was increased by only 0.6 point conceivably resides in that hardness decreased at the end face close to the weld overlay owing to weld heat input.

As obvious from the investigation of the test results discussed above, the quality of the sample of Example 3 is good enough in terms of end face surface, inner peripheral surface hardness and outer peripheral surface hardness, and cracking in the base material and in the weld overlay. Although there were found some cracks which occurred in the weld overlay just after welding, these cracks terminated at the interface between the weld overlay and the base material so that it was supposed that they would not cause any problems. Regarding Example 4, the sample did not undergo the final step but had sufficient end face hardness. Further, the cracks which had been created in the weld overlay during overlaying terminated at the interface between the weld overlay and the base material and the cracks which had been created in the weld overlay during oil hardening terminated at the surface layer of the weld overlay. It can be judged from these results that Example 4 meets the required quality.

On the other hand, Comparative Examples 2 to 8 do not satisfy the required quality. Specifically, Comparative Examples 2, 4 and 5 have cracks in their base materials; Comparative Examples 6 and 8 have low hardness throughout their respective end faces although there are no cracks in their base materials; and Comparative Examples 3 and 7 do not satisfy the desired end face hardness in some regions.

Figure 34:
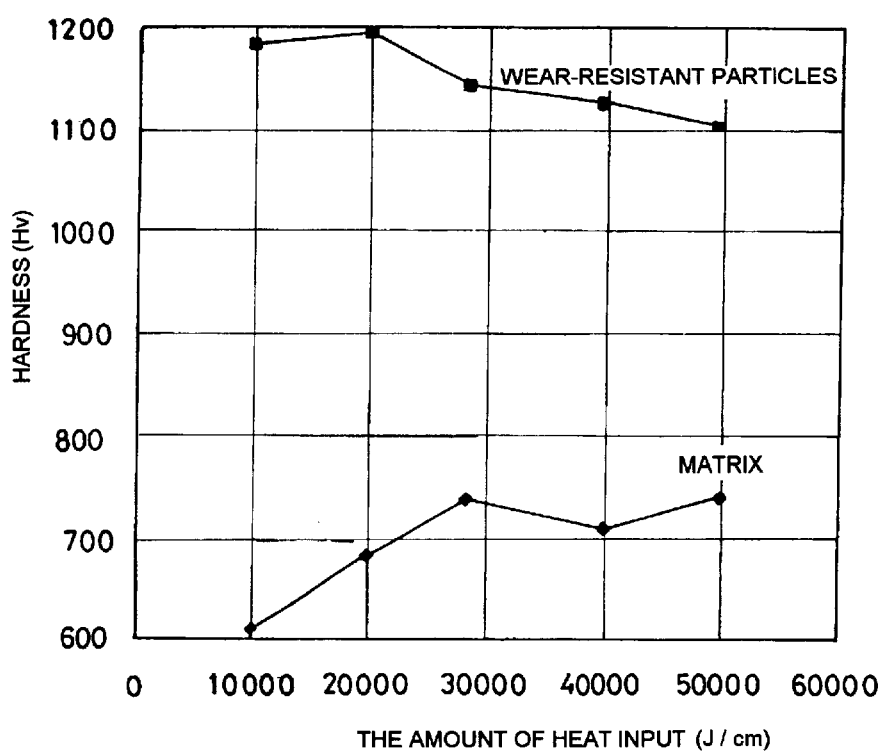
FIG. 34 is a graph showing the influence of the amount of weld heat input upon the average hardness of a matrix and wear-resistant particles.

One effective method for making a wear surface smooth is such that, in the process of overlaying, the amount of weld heat input is increased whereby the difference in wear resistance between the wear-resistant particles and the matrix is reduced. FIG. 34 shows the effects of the amount of weld heat input upon the harness of the wear-resistant particles and of the matrix. It should be noted that the effects of the amount of weld heat input vary depending on the size of a part, the shape of an overlay and preheating temperature, and the hardness is also affected by cooling rate after overlaying. Therefore, the data shown herein are based on only the tendency.

As the amount of weld heat input is increased, the deterioration of the wear-resistant particles proceeds with decreases in hardness, while a large amount of carbide precipitates over the entire matrix with increases in hardness, the carbide being produced from tungsten and carbon which have been melted out of the wear-resistant particles. The difference in wear resistance between the wear-resistant particles and the matrix can be reduced by increasing the amount of weld heat input and accordingly the wear-resistant particles and the matrix wear in a like manner, resulting in a smooth wear surface. Of minerals which constitute soil and sand, silica contributes to wear most significantly, and the hardness of silica is $H_V$ 700 to 1,200. Therefore, the wear-resistant particles and the matrix wear in a substantially similar manner, provided that wear resistant particles having a hardness of $H_V$ 1,200 or more account for no more than 50% of all the wear-resistant particles and the hardness of the matrix is $H_V$ 700 or more.

(3) Use of a sprocket and bushings in combination

Figure 35:
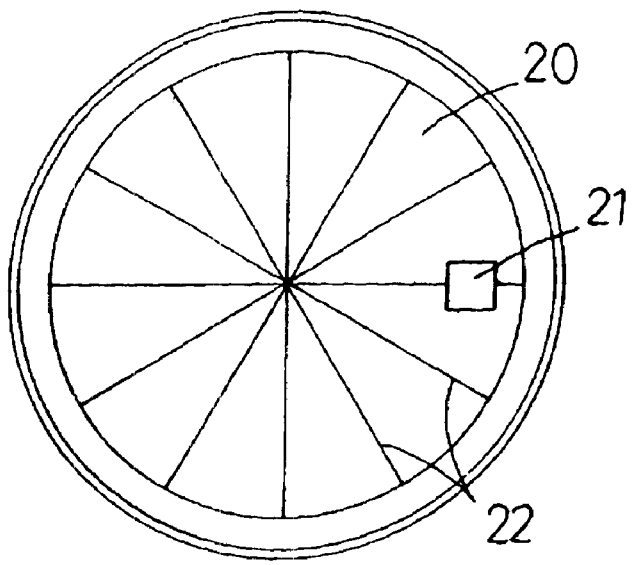
FIGS. 35(a) and 35(b) are views of an oil sand wear testing machine.
Figure 35:
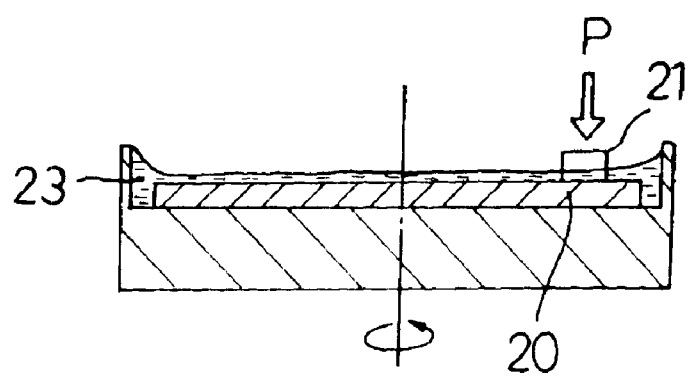

To check the effects of the sprocket 6 and the bushing 3 when used in combination, a test for measuring their respective wear amounts was conducted in which a rotating disc 20 serving as a model of sprocket teeth was pressed against a block 21 serving as a bushing, as shown in FIG. 35. In this test, radical slits 22 (12 slits each having a width of 2 mm) used for catching oil sand therein were formed on the surface of the disc 20 and oil sand (70% silica (70 mesh to 281 mesh); 20% Mobil TAC QQ; 10% Mobil Vactra Oil No.2) 23 was interposed between the disc 20 and the block 21. The test conditions are as follows.

Surface pressure: 0.065 kg/mm$^2$
Sliding speed: 0.9896 m/min
Sliding area: block=900 mm$^2$, disc=0,970 mm$^2$
Test time: 45 hours Specimens for the disc 20 and the block 21 were prepared. As specimens for the disc 20, the following three types of workpieces were prepared: (1) a water-quenched, tempered product made from SCM435 (hardness=$H_R$C53); (2) a fine-particle containing overlaid product made from SS400 and having a scarce particle distribution (equivalent to an initial wear condition); and (3) a fine-particle containing overlaid product made from SS400 and having a dense particle distribution. As specimens for the block 21, the following two types of workpieces were prepared: (1) a product made from SAE4161A and having a hardness of $H_R$C59; and (2) a fine-particle containing overlaid product made from SCM415 and having a dense particle distribution. The test faces of the disc 20 and the block 21 were both G-finished.

The overlaid product of the block 21 was prepared by gas carburization, quenching and tempering after overlaying. The fine-particle containing overlaid product having a scarce particle distribution (equivalent to an initial wear condition,) is a product of which upper layer serves as a sliding contact surface while the fine-particle containing overlaid product having a dense particle distribution is a product of which lower layer serves as a sliding contact surface (see FIG. 36(a)).

Figure 36:
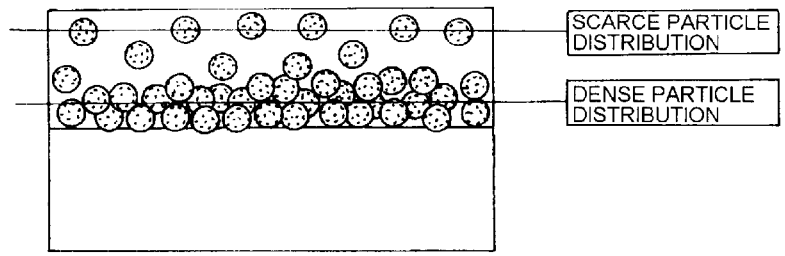
FIG. 36(a) is a view showing the cross section of a cut in a specimen and FIG. 36(b) is graph of the result of a wear test.
Figure 36:
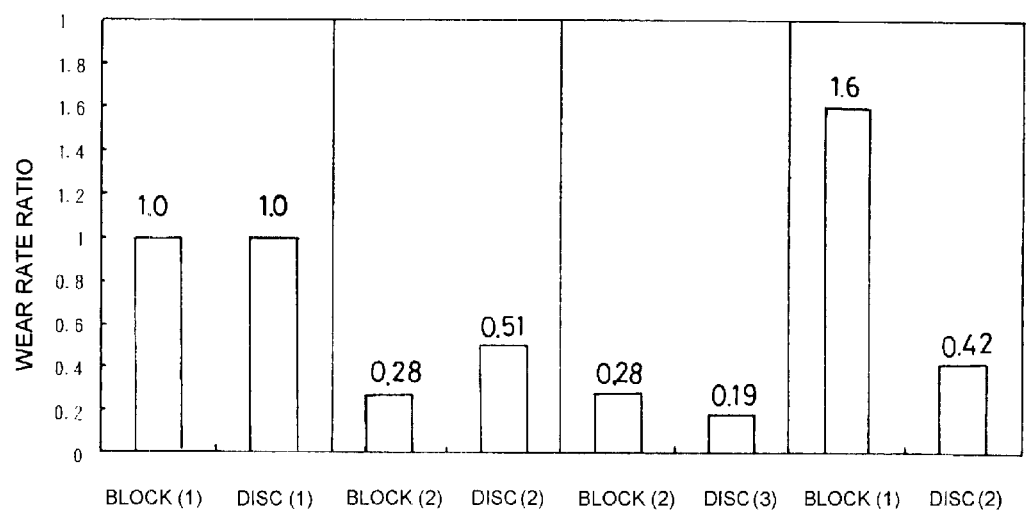

FIG. 36(b) shows the result of the test. It is seen from this figure that when the unoverlaid products (i.e., the block (1) and disc (1)) were used in combination and subjected to sliding movement, their wear rates were 1.0. In contrast with this, the wear rates of the fine-particle containing overlaid products when used in combination in a sliding condition had smaller values, and particularly the wear rates obtained when the fine-particle containing overlaid products having a dense particle distribution were used in a sliding condition were the smallest. In the case where SAE4161A was used as the block 21 and the fine-particle containing overlaid product having a scarce particle distribution (equivalent to an initial wear condition) was used as the disc 20, that is, the block (1) and the disc (2) were used in combination, the protruding wear-resistant particles of the disc scraped the mating member (block) off, resulting in increases in the wear rate of the block.

It can be understood from the above investigation that the greatest effect can be obtained when overlaid products including fine wear-resistant particles densely distributed therein are used in combination as the sprocket 6 and the bushing 3.

Figure 37:
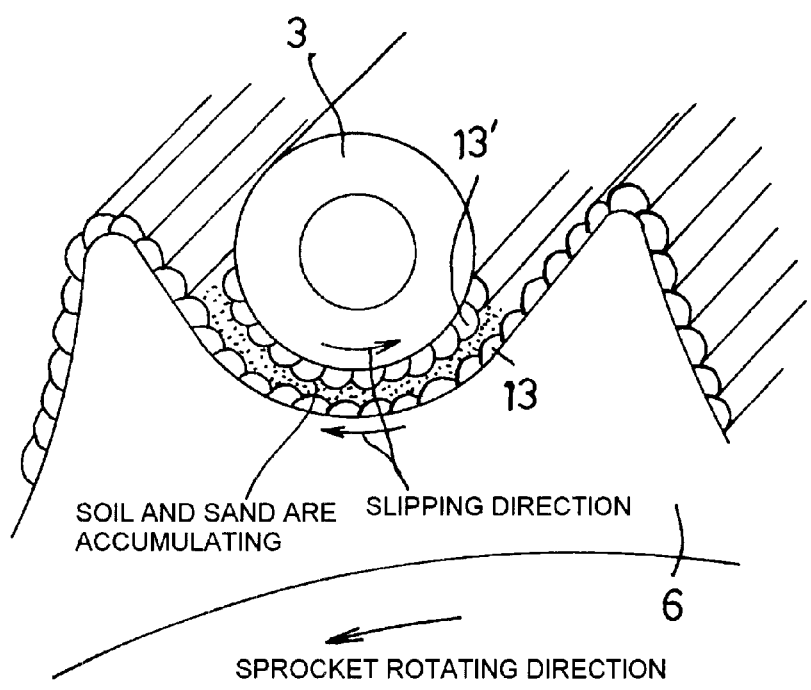
FIG. 37 illustrates that soil and sand are entrapped in a concave portion on an overlay surface and the overlay surface becomes smooth at an early stage because of the wear of itself.

The unevenness of the surface of a weld overlay could be a stress concentration source as seen from the result of the above-described drop weight test in which cracks started from the recesses of a weld overlay with an uneven surface, resulting in breakage. Therefore, it is preferable in view of improved durability that a weld overlay be smoothed at an early stage by its own wear. As shown in FIG. 37, this effect can be attained by the arrangement in which the overlaying directions of the sprocket and the bushing are transverse, most preferably, perpendicular to the rotating direction of the sprocket. More concretely, by making the overlaying directions of the sprocket and the bashing perpendicular to the rotating direction of the sprocket, soil and sand entrapped in the recesses at the time of occurrence of slipping can be constantly supplied to the sliding surfaces so that the unevenness of the surfaces can be worn away at an early stage by means of the soil and sand working as an abrasive. The smooth surfaces are, of course, free from the source of stress concentration, so that improved fatigue strength can be achieved.

The concept of the technique disclosed in the present invention is equally applicable to sliding members which are used in a situation similar to that described above and which catch and entrap soil and sand. Examples of the sliding members include idlers, track rollers, carrier rollers and the treads of track links all used for base carriers.

What is claimed is:

1. A base carrier for a tracklaying vehicle, the base carrier comprising a crawler belt having bushings each mounted between a pair opposed links and a sprocket having a plurality of teeth meshing with the bushings respectively, each of the sprocket teeth having a weld overlay containing hard particles and composed of beads each running in a direction transverse to the rotating direction of the sprocket, the hard particles being contained in the weld overlay so as not to protrude from the surface of the weld overlay and so as to be densely distributed in the bottom area of the weld overlay.

2. A base carrier for a tracklaying vehicle according to claim 1, wherein the hard particles are distributed in a less amount at the tip of each tooth than at the dedendum thereof and/or not contained at the end of the tip.

3. A base carrier for a tracklaying vehicle according to claim 1 or 2, wherein the hard particles are distributed in a more amount in the area intermediate between the dedendum and the tooth tip than at the dedendum and at the tooth tip.

4. A base carrier for a tracklaying vehicle according to claim 1 or 2, wherein the hard particles are contained in the weld overlay so as to be distributed at spacings less than or equal to the size of soil and sand to be entrapped.

5. A base carrier for a tracklaying vehicle, the base carrier comprising a crawler belt having bushings each mounted between a pair of opposed links and a sprocket having a plurality of teeth meshing with the bushings respectively, wherein a weld overlay containing hard particles is formed on the outer peripheral surface of each of the bushings, the outer peripheral surface serving as a contact surface for the sprocket that engages with the bushing and wherein the core of each bushing is made of steel of high tenacity, the hard particles being contained in the weld overlay so as not to protrude from the surface of the weld overlay and so as to be densely distributed in the bottom area of the weld overlay.

6. A base carrier for a tracklaying vehicle according to claim 5, wherein the outer peripheral surface of each bushing is provided with a hardened layer.

7. A base carrier for a tracklaying vehicle according to claim 5 or 6, wherein the weld overlay is formed such that each bead extends in a direction transverse to the rotating direction of sprocket.

8. A base carrier for a tracklaying vehicle according to claim 5 or 6, wherein the weld overlay is so formed on each bushing as to extend circumferentially over a substantially half of the outer peripheral surface of the bushing, the outer peripheral surface engaging with the sprocket.

9. A base carrier for a tracklaying vehicle according to claim 5 or 6, wherein the hard particles are contained in the weld overlay so as not to protrude from the surface of the weld overlay and so as to be densely distributed in the bottom area of the weld overlay.

10. A base carrier for a tracklaying vehicle according to claim 9, wherein the hard particles are contained in the weld overlay so as to be distributed at spacings less than or equal to the size of soil and sand to be entrapped.

11. A base carrier for a tracklaying vehicle according to claim 5 or 6, wherein the weld overlay is so formed that strip-like overlay beads containing the hard particles are aligned successively in parallel.

12. A base carrier for a tracklaying vehicle according to claim 5 or 6, wherein the weld overlay is so formed the strip-like overlay beads containing the hard particles and strip-like overlay beads containing no hard particles are alternately successively aligned in parallel.

13. A hard facing method for applying a weld overlay to each of the tooth flanks of a sprocket having a plurality of teeth to produce wear-resistant sprocket teeth, wherein overlaying is successively carried out such that each bead extends in a direction transverse to the rotating direction of the sprocket teeth and interpass temperature is controlled so as to make the amount of heat input for each tooth substantially constant during the overlaying.

14. A hard facing method for sprocket teeth according to claim 13, wherein overlaying is carried out in such a way that hard particles are added to a molten weld pool being formed on a base material of the sprocket teeth by means of an arc to form, on the base material, a weld overlay containing the hard particles.

15. A hard facing method for sprocket teeth according to claim 14, wherein overlaying is carried out with some latitude in the grain size distribution of the hard particles for allowing dense charge with the hard particles.

16. A hard facing method for sprocket teeth according to claim 14 or 15, wherein cemented carbide is used as the hard particles and the components of the cemented carbide are allowed to melt into molten metal so that carbide precipitates over the entire area of a matrix surrounding the cemented carbide.

17. A hard facing method for sprocket teeth according to claim 14, wherein overlaying is carried out while the amount of hard particles to be supplied being controlled such that the hard particles are not contained in the tooth tip.

18. A hard facing method for sprocket teeth according to claim 14, wherein overlaying is carried out while overlaying rate or the amount of hard particles to be supplied being controlled such that the weld overlay formed near the tooth tip becomes thin or such that the hard particles contained in the weld overlay near the tooth tip become scarce.

19. A hard facing method for sprocket teeth according to claim 13 or 14, wherein quench/tempering and preheating are applied to the sprocket teeth prior to overlaying.

20. A hard facing method for sprocket teeth according to claim 13 or 14, wherein postheating is carried out after overlaying for alleviating surface residual stresses imposed on the sprocket teeth.

21. A hard facing method for sprocket teeth according to claim 13 or 14, wherein after overlaying, weld deformation which occurred in the sprocket teeth is corrected and press quenching is carried out to remove portions affected by weld heat.

22. A hard facing method for applying a weld overlay to the outer peripheral surface of a bushing to produce a wear-resistant bushing, the inner and outer peripheral surfaces of the bushing having been subjected to machining, the method comprising:

a) a weld overlay formation step for supplying hard particles to a molten weld pool being formed on a base material of the bushing by use of an arc to form a weld overlay containing the hard particles on the base material;

b) a first thermal treatment step for applying gas carburization to the bushing on which the weld overlay has been formed; and c) a second thermal treatment step for applying reheating/quenching and tempering to the bushing after the first thermal treatment step.

23. A hard facing method for applying a weld overlay to the outer peripheral surface of a bushing to produce a wear-resistant bushing, the inner and outer peripheral surfaces of the bushing having been subjected to machining, the method comprising:

(a) a weld overlay formation step for supplying hard particles to a molten weld pool being formed on a base material of the bushing by use of an arc to form a weld overlay containing the hard particles on the base material;

(b) a first thermal treatment step for applying non-oxidative heating/oil hardening and tempering to the bushing on which the weld overlay has been formed; and (c) a second thermal treatment step for carrying out, subsequently to the first thermal treatment step, inner-peripheral-surface hardening and tempering, the inner-peripheral-surface hardening being carried out in such a manner that the inner peripheral surface of the bushing is subjected to induction heating while the outer peripheral surface thereof being cooled.

24. A hard facing method for bushings according to claim 22 or 23, wherein the weld overlay formation is carried with some latitude in the grain size distribution of the hard particles for allowing dense charge with the hard particles.

25. A hard facing method for bushings according to claim 22 or 23, wherein cemented carbide is used as the hard particles and the components of the cemented carbide are allowed to melt into molten metal so that carbide precipitates over the entire area of a matrix surrounding the cemented carbide.

26. A hard facing method for bushings according to claim 22 or 23, wherein a preheating step is adapted for heating the bushing to a predetermined temperature prior to the weld overlay formation step.

27. A hard facing method for bushings according to claim 22 or 23, wherein a postheating step is adapted for heating the bushing to a predetermined temperature after the weld overly formation step.

28. A hard facing method for bushings according to claim 22 or 23, wherein press-fit-portion grinding, end face grinding, and end face burnishing are applied to the outer peripheral surface of the bushing as finishing treatments after the second thermal treatment step.

29. A base carrier for a tracklaying vehicle, the base carrier comprising a crawler belt having bushings each mounted between a pair of opposed links and a sprocket having a plurality of teeth meshing with the bushings respectively, each of the sprocket teeth having a weld overlay containing hard particles and composed of beads each running in a direction transverse to the rotating direction of the sprocket, wherein a weld overlay containing hard particles is formed on the outer peripheral surface of each of the bushings, the outer peripheral surface serving as a contact surface for the sprocket that engages with the bushing and wherein the core of each bushing is made of steel of high tenacity, the hard particles being contained in the weld overlay so as not to protrude from the surface of the weld overlay and so as to be densely distributed in the bottom area of the weld overlay.

* * * * *